(12) United States Patent
Yoshida et al.

(10) Patent No.: US 9,934,742 B2
(45) Date of Patent: Apr. 3, 2018

(54) DISPLAY PANEL AND DISPLAY DEVICE INCLUDING SAME

(71) Applicant: Sharp Kabushiki Kaisha, Osaka-shi, Osaka (JP)

(72) Inventors: Hidefumi Yoshida, Osaka (JP); Kohhei Tanaka, Osaka (JP)

(73) Assignee: Sharp Kabushiki Kaisha, Sakai (JP)

( * ) Notice: Subject to any disclaimer, the term of this patent is extended or adjusted under 35 U.S.C. 154(b) by 0 days.

(21) Appl. No.: 15/024,042

(22) PCT Filed: Aug. 26, 2014

(86) PCT No.: PCT/JP2014/072277
§ 371 (c)(1),
(2) Date: Mar. 23, 2016

(87) PCT Pub. No.: WO2015/045710
PCT Pub. Date: Apr. 2, 2015

(65) Prior Publication Data
US 2016/0210923 A1    Jul. 21, 2016

(30) Foreign Application Priority Data
Sep. 26, 2013 (JP) ................................ 2013-200365

(51) Int. Cl.
G09G 5/02         (2006.01)
G06F 3/038        (2013.01)
(Continued)

(52) U.S. Cl.
CPC ....... G09G 3/3655 (2013.01); G02F 1/13454 (2013.01); G02F 1/133512 (2013.01);
(Continued)

(58) Field of Classification Search
CPC ..... G09G 2330/021; G09G 2320/0233; G09G 3/3233
See application file for complete search history.

(56) References Cited

U.S. PATENT DOCUMENTS

2003/0030606 A1    2/2003  Hector et al.
2007/0229424 A1*  10/2007  Hayashi ................ G02F 1/1343
                                                              345/89
(Continued)

FOREIGN PATENT DOCUMENTS

JP    10-104433 A    4/1998
JP    11-184406 A    7/1999
(Continued)

OTHER PUBLICATIONS

Official Communication issued in International Patent Application No. PCT/JP2014/072277, dated Nov. 25, 2014.

*Primary Examiner* — Nan-Ying Yang
(74) *Attorney, Agent, or Firm* — Keating & Bennett, LLP

(57) ABSTRACT

Provided is a display panel that reduces occurrence of display irregularities in a display region even in a case where driving circuits that switch gate lines between selected and non-selected states are provided in the display region. A display panel of the present invention includes an active matrix substrate and a counter substrate, the active matrix substrate being provided with a plurality of gate lines and a plurality of source lines. The active matrix substrate includes, in a display region, a driving circuit provided with respect to each of the gate lines, for switching the gate line between a selected state and a non-selected state. The display panel further includes, in a non-installation region where the driving circuit is not provided, an aperture ratio adjustment member that changes an aperture ratio in the non-installation region stepwise, in order to decrease a (Continued)

difference between a luminance in an installation region where the driving circuit is provided and a luminance in the non-installation region.

5 Claims, 28 Drawing Sheets

(51) Int. Cl.
*G09G 5/00* (2006.01)
*G09G 5/10* (2006.01)
*G09G 3/36* (2006.01)
*G02F 1/1345* (2006.01)
*G02F 1/1362* (2006.01)
*G02F 1/1335* (2006.01)

(52) U.S. Cl.
CPC ..... *G02F 1/136286* (2013.01); *G09G 3/3607* (2013.01); *G09G 3/3677* (2013.01); *G09G 5/10* (2013.01); *G02F 2201/52* (2013.01); *G09G 2300/0452* (2013.01); *G09G 2300/0465* (2013.01); *G09G 2320/0233* (2013.01)

(56) References Cited

U.S. PATENT DOCUMENTS

| | | | |
|---|---|---|---|
| 2013/0321499 A1* | 12/2013 | Park | G09G 3/20 345/698 |
| 2015/0293546 A1 | 10/2015 | Tanaka et al. | |

FOREIGN PATENT DOCUMENTS

| | | |
|---|---|---|
| JP | 2004-538511 A | 12/2004 |
| JP | 2007-271782 A | 10/2007 |
| JP | 2009-271308 A | 11/2009 |
| JP | 2013-15680 A | 1/2013 |

* cited by examiner

Backlight position in X direction

DISPLAY PANEL AND DISPLAY DEVICE INCLUDING SAME

TECHNICAL FIELD

The present invention relates to a display panel and a display device including the same, and particularly relates to an arrangement of gate drivers.

BACKGROUND ART

Conventionally, a display panel in which a gate driver and a source driver are formed on adjacent two sides of an active matrix substrate has been known. Translation of PCT Application No. 2004-538511 (JP-T-2004-538511) discloses techniques for allowing row driving circuits that drive column address conductors to which data signals are supplied, and column driving circuits that drive row address conductors to which row selection signals are supplied, to be disposed on one side of a pixel element array. According to JP-T-2004-538511, with this configuration, peripheral regions around the pixel element array on a support body that holds the pixel element array or the like are not to be limited by these driving circuits.

DISCLOSURE OF INVENTION

By providing the gate driver and the source driver on one side of the active matrix substrate, as is the case with JP-T-2004-538511 mentioned above, the frame can be narrowed on the other three sides. In Patent Document 1 mentioned above, however, the distance for which the gate lines are routed is longer than conventionally, which increases the loads on the gate lines. Consequently, potentials imparted to the gate lines are dulled, which makes high-speed driving of the gate lines difficult. The inventors of the present invention have invented an active matrix substrate characterized in that driving circuits that switch gate lines between selected and non-selected states are provided in a display region, and filed an application (Japanese Patent Application No. 2012-238805). By providing the driving circuits in the display region, the dullness of the gate lines is reduced, and at the same time, a narrower frame can be achieved. By providing the driving circuits in the display region, however, pixels where driving circuits are provided have aperture ratios smaller than those of pixels where driving circuits are not provided, thereby having different aperture ratios in the display region. This results in luminance differences in the display region, thereby causing display irregularities.

It is an object of the present invention to provide techniques for reducing occurrence of display irregularities in a display region even in a case where driving circuits that switch gate lines between selected and non-selected states are provided in the display region.

A display panel according to the first invention includes an active matrix substrate and a counter substrate, the active matrix substrate being provided with lines including a plurality of gate lines and a plurality of source lines, wherein the active matrix substrate includes, in a display region, a driving circuit provided with respect to each of the gate lines, the driving circuit switching the gate line between a selected state and a non-selected state. The display panel further includes, in a non-installation region where the driving circuit is not provided, an aperture ratio adjustment member that changes an aperture ratio in the non-installation region stepwise, in order to decrease a difference between a luminance in an installation region where the driving circuit is provided and a luminance in the non-installation region.

The second invention is the first invention further characterized in that the aperture ratio adjustment member is an adjustment line, and the adjustment line is provided in the non-installation region so that, in the non-installation region, the aperture ratio decreases as the proximity to the installation region increases.

The third invention is the second invention further characterized in that the adjustment line is formed with the same member as that of any of the lines, and is formed simultaneously in a process in which said line is formed on the active matrix substrate.

The fourth invention is characterized in that the counter substrate includes a black matrix, the aperture ratio adjustment member is the black matrix, and the black matrix is formed on the counter substrate so that, in the non-installation region, the aperture ratio decreases as the proximity to the installation region increases.

The fifth invention is any of the first to fourth invention further characterized in that the counter substrate further includes a color filter, the display region includes a pixel that includes subpixels of a plurality of colors, the driving circuit is arranged on one of the subpixels corresponding to one of the plurality of colors in the installation region, and the subpixel on which the driving circuit is provided is formed so as to be greater than the other subpixels provided in the pixel that includes said subpixel, and the subpixels provided in the pixel in the non-installation region are formed in approximately equal sizes.

The display device according to the sixth invention includes the display panel according to any one of the first to fifth inventions, and a light emission part that emits light from a side of the active matrix substrate of the display panel, in such a manner that a difference between a luminance in the installation region and a luminance in the non-installation region decreases.

With the configuration of the present invention, even in a case where a driving circuit that switches a gate line between a selected state and a non-selected state is provided in a display region, the occurrence of display irregularities in the display region can be reduced.

DESCRIPTION OF PREFERRED EMBODIMENTS

Figure 1:
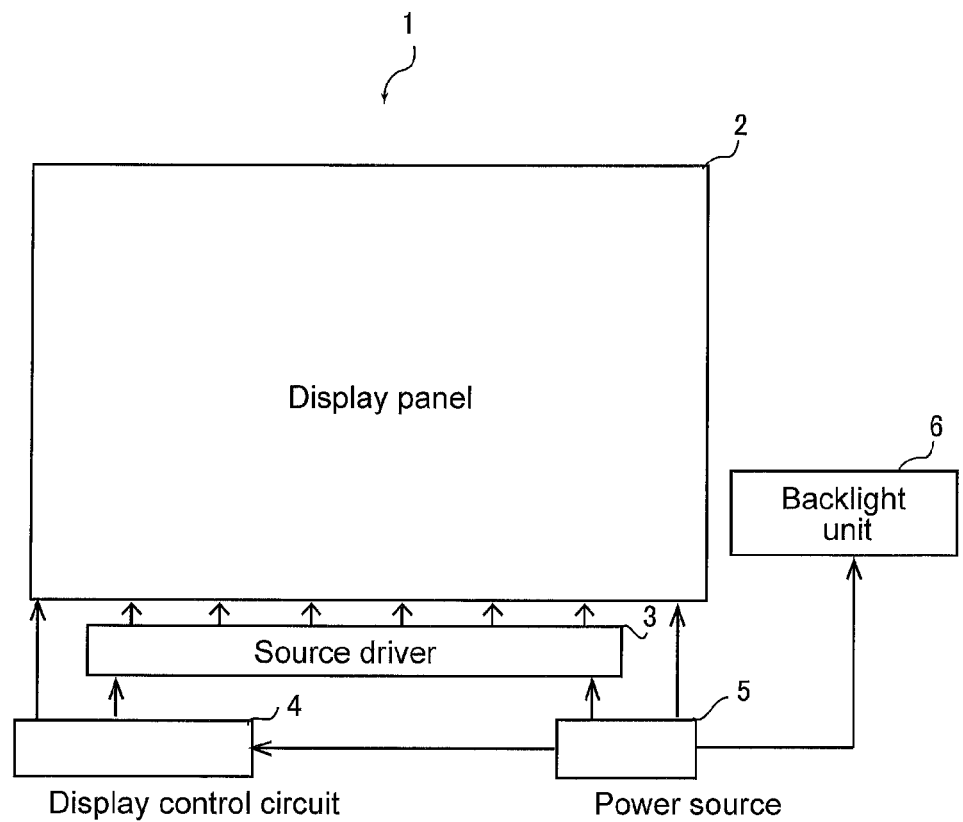
FIG. 1 is a schematic diagram illustrating a schematic configuration of a liquid crystal display device according to Embodiment 1.

A display panel according to one embodiment of the present invention is a display panel that includes an active matrix substrate and a counter substrate, the active matrix substrate being provided with lines including a plurality of gate lines and a plurality of source lines, wherein the active matrix substrate includes, in a display region, a driving circuit provided with respect to each of the gate lines, the driving circuit switching the gate line between a selected state and a non-selected state. The display panel further includes, in a non-installation region where the driving circuit is not provided, an aperture ratio adjustment member that changes an aperture ratio in the non-installation region stepwise, in order to decrease a difference between a luminance in an installation region where the driving circuit is provided and a luminance in the non-installation region (the first configuration).

According to the first configuration, each of the plurality of gate lines is switched between the selected state and the non-selected state, by the driving circuit provided in the display region. In the display region, the installation region where the driving circuit is provided and the non-installation region where the driving circuit is not provided have different aperture ratios. The non-installation region is provided with an aperture ratio adjustment member that changes the aperture ratio stepwise so that a difference between a luminance in the installation region and a luminance in the non-installation region decreases. In the case where the driving circuit is provided in the display region, therefore, the luminance difference due to a difference of the aperture ratios in the display region is reduced as compared with the case where the aperture ratio adjustment member is not provided in the non-installation region, whereby display irregularities can be reduced.

The second configuration may be the first configuration further characterized in that the aperture ratio adjustment member is an adjustment line, and the adjustment line is provided in the non-installation region so that, in the non-installation region, the aperture ratio decreases as the proximity to the installation region increases.

According to the second configuration, an adjustment line is provided so that, in the non-installation region, the aperture ratio decreases as the proximity to the installation region increases. This results in that the difference between the luminance in the installation region and the luminance in the non-installation region does not change abruptly, whereby display irregularities can be reduced.

The third configuration may be the second configuration further characterized in that the adjustment line is formed with the same member as that of any of the lines, and is formed simultaneously in the same process in which said line is formed on the active matrix substrate.

According to the third configuration, in the process in which any one line on the active matrix substrate is formed, the adjustment line is formed simultaneously with the line. This makes it possible to manufacture the active matrix substrate, without adding a step for forming the adjustment line.

The fourth configuration may be the first configuration further characterized in that the counter substrate includes a black matrix, the aperture ratio adjustment member is the black matrix, and the black matrix is formed on the counter substrate so that, in the non-installation region, the aperture ratio decreases as the proximity to the installation region increases.

According to the fourth configuration, the black matrix is formed on the counter substrate so that, in the non-installation region, the aperture ratio decreases as the proximity to the installation region increases. In other words, in the non-installation region, as the proximity to the installation region increases, the area light-shielded by the black matrix increases. With this, the difference between the luminance in the installation region and the luminance in the non-installation region does not change abruptly, whereby display irregularities can be reduced.

The fifth configuration may be any one of the first to fourth configurations further characterized in that the counter substrate further includes a color filter, the display region includes a pixel that includes subpixels of a plurality of colors, the driving circuit is arranged on one of the subpixels corresponding to one of the plurality of colors in the installation region, and the subpixel on which the driving circuit is provided is formed so as to be greater than the other subpixels provided in the pixel that includes said subpixel, and the subpixels provided in the pixel in the non-installation region are formed in approximately equal sizes.

According to the fifth configuration, in the installation region, the subpixel on which the driving circuit is arranged is formed so as to be greater than the subpixels of the other colors. Besides, the subpixels in the non-installation region are formed in approximately equal sizes. By forming the subpixel on which the driving circuit is provided is formed so as to be greater than the other subpixels, the aperture ratio of the subpixel on which the driving circuit is provided can be made greater, as compared with a case where said subpixel is formed in a size equal to the size of the other subpixels. Further, since the configuration is such that the aperture ratio of the non-installation region changes stepwise so that the difference between the luminance in the non-installation region and the luminance in the installation region decreases, the difference between the aperture ratio in the installation region where the driving circuit is provided and the non-installation region whereby the driving circuit is not provided decreases, which allows the difference between the luminance in the installation region and the luminance in the non-installation region to be reduced. Still further, even in a case where the subpixels are small in size, the driving circuit can be arranged on a subpixel of one color in the installation region by forming said subpixel greater than the other subpixels in the installation region.

A display device according to one embodiment of the present invention includes the display panel according to any one of the first to fifth configurations, and a light emission part that emits light from a side of the active matrix substrate of the display panel, in such a manner that a difference between a luminance in the installation region and a luminance in the non-installation region decreases (the sixth configuration).

According to the sixth configuration, an aperture ratio adjustment member that changes an aperture ratio stepwise is provided in the non-installation region, and light is emitted from the light emission part, so that a difference between the luminance in the installation region where the driving circuit is provided and the luminance in the non-installation region where no driving circuit is provided decreases. This allows the difference between the luminance in the installation region and the luminance in the non-installation region to be further reduced, whereby the luminance of the display surface is made uniform, and display irregularities can be further reduced.

Hereinafter, embodiments of the present invention are described in detail, with reference to the drawings. Identical or equivalent portions in the drawings are denoted by the same reference numerals, and descriptions of the same are not repeated.

<Embodiment 1>
(Configuration of Liquid Crystal Display Device)

FIG. 1 is a schematic diagram illustrating a schematic configuration of a liquid crystal display device according to the present embodiment. A liquid crystal display device 1 includes a display panel 2, a source driver 3, a display control circuit 4, a power source 5, and a backlight unit 6. The display panel 2 is electrically connected with the source driver 3 formed on a flexible substrate. The display control circuit 4 is electrically connected with the display panel 2, the source driver 3, and the power source 5. The display control circuit 4 outputs control signals to the source driver 3, and driving circuits formed in the display panel 2 (hereinafter referred to as "gate drivers"), which are to be described below. The control signals include a reset signal (CLR), clock signals (CKA, CKB), data signals, and the like for displaying images on the display panel 2. The power source 5 is electrically connected with the display panel 2, the source driver 3, the display control circuit 4, and the backlight unit 6, and supplies a power source voltage signal to the same.

The backlight unit 6 includes a backlight having a light source, and an inverter for driving the backlight (both not shown). The backlight is, for example, an edge light type backlight. The backlight is provided below the display panel 2, and emits light at a predetermined luminance so that luminance of the backlight in the display region is approximately uniform.

Figure 2:
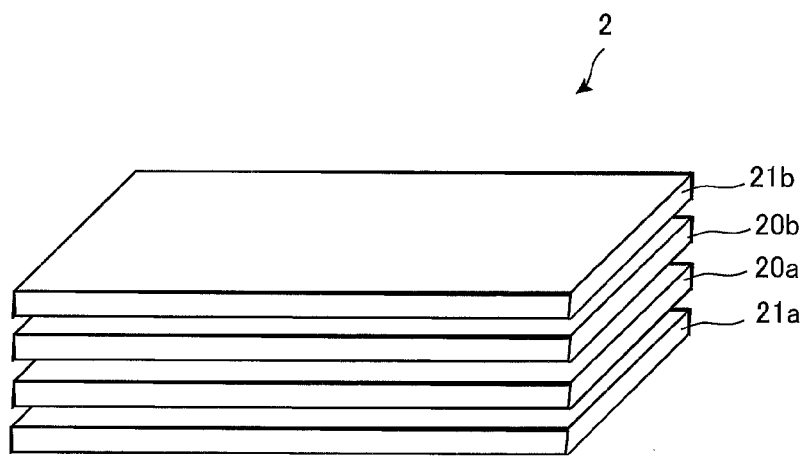
FIG. 2 is a schematic diagram illustrating a schematic configuration of the display panel illustrated in FIG. 1.

FIG. 2 is a schematic diagram illustrating a schematic configuration of the display panel 2 illustrated in FIG. 1. As illustrated in FIG. 2, the display panel 2 includes an active matrix substrate 20a, a counter substrate 20b, and a liquid crystal layer (not shown) interposed between these substrates. Further, the display panel 2 includes polarizing plates 21a and 21b on a lower surface side of the active matrix substrate 20a and on an upper surface side of the counter substrate 20b, respectively.

Figure 3:
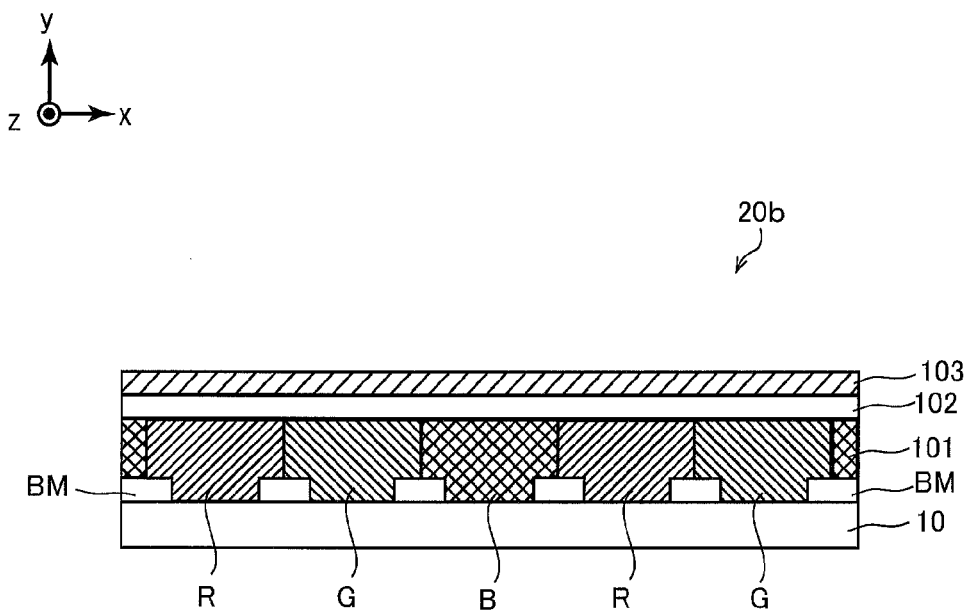
FIG. 3 is a cross-sectional view illustrating a schematic configuration of a counter substrate illustrated in FIG. 1.

FIG. 3 is a schematic diagram illustrating a cross section of the counter substrate 20b illustrated in FIG. 2. As illustrated in FIG. 3, on the counter substrate 20b, on the glass substrate 10 thereof, a black matrix BM to be described below is formed that shields regions other than apertures of the pixel regions on the active matrix substrate 20a. On the black matrix BM, a color filter 101 of three colors, that is, red (R), green (G), and blue (B), is formed. On the color filter 101, an overcoat layer 102 is formed, and on the overcoat layer 102, a common electrode 103 composed of a transparent conductive film made of ITO or the like is formed.

Figure 4A:
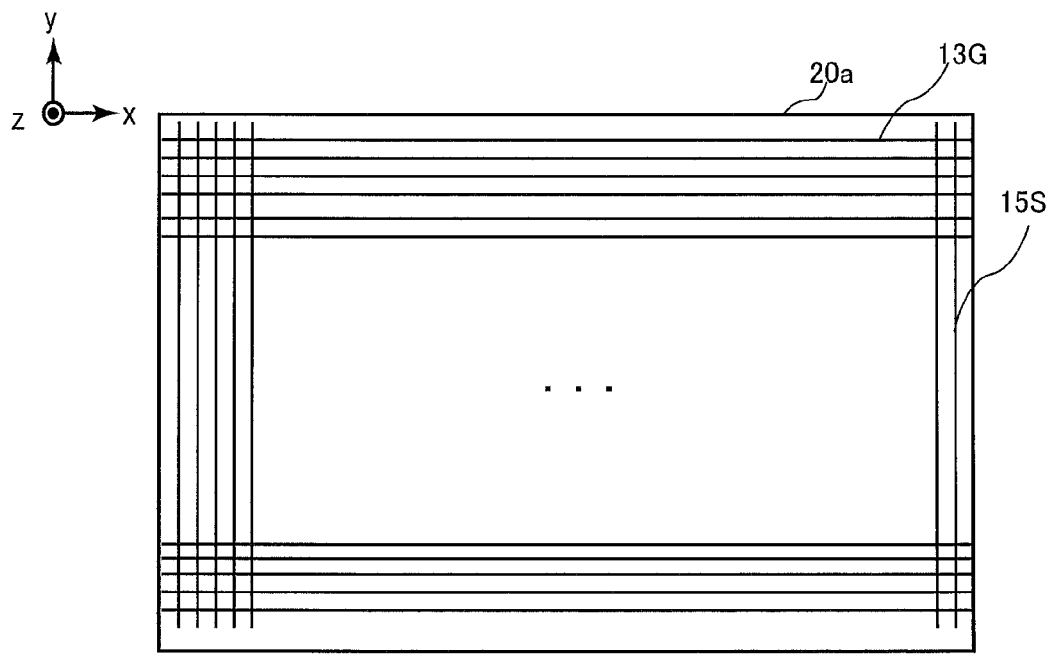
FIG. 4A is a schematic diagram illustrating a schematic configuration of an active matrix substrate illustrated in FIG. 2.

Next, the configuration of the active matrix substrate 20a is described. FIG. 4A is a top view illustrating a schematic configuration of the active matrix substrate 20a. On the active matrix substrate 20a, a plurality of gate lines 13G (13G(1) to 13G(n)) are formed at uniform intervals from one end to the other end in the x axis direction so as to be approximately in parallel with one another. Hereinafter, when the gate lines 13G(1) to 13G(n) are not distinguished, these are referred to as the "gate lines 13G". Further, on the active matrix substrate 20a, a plurality of source lines 15S are formed so as to intersect the gate line 13G groups.

Regions surrounded by the gate lines 13G and the source lines 15S are subpixel regions corresponding to any of the colors of RGB of the color filters 101 on the counter substrate 20b. One pixel is composed of subpixel regions of RGB.

Figure 4B:
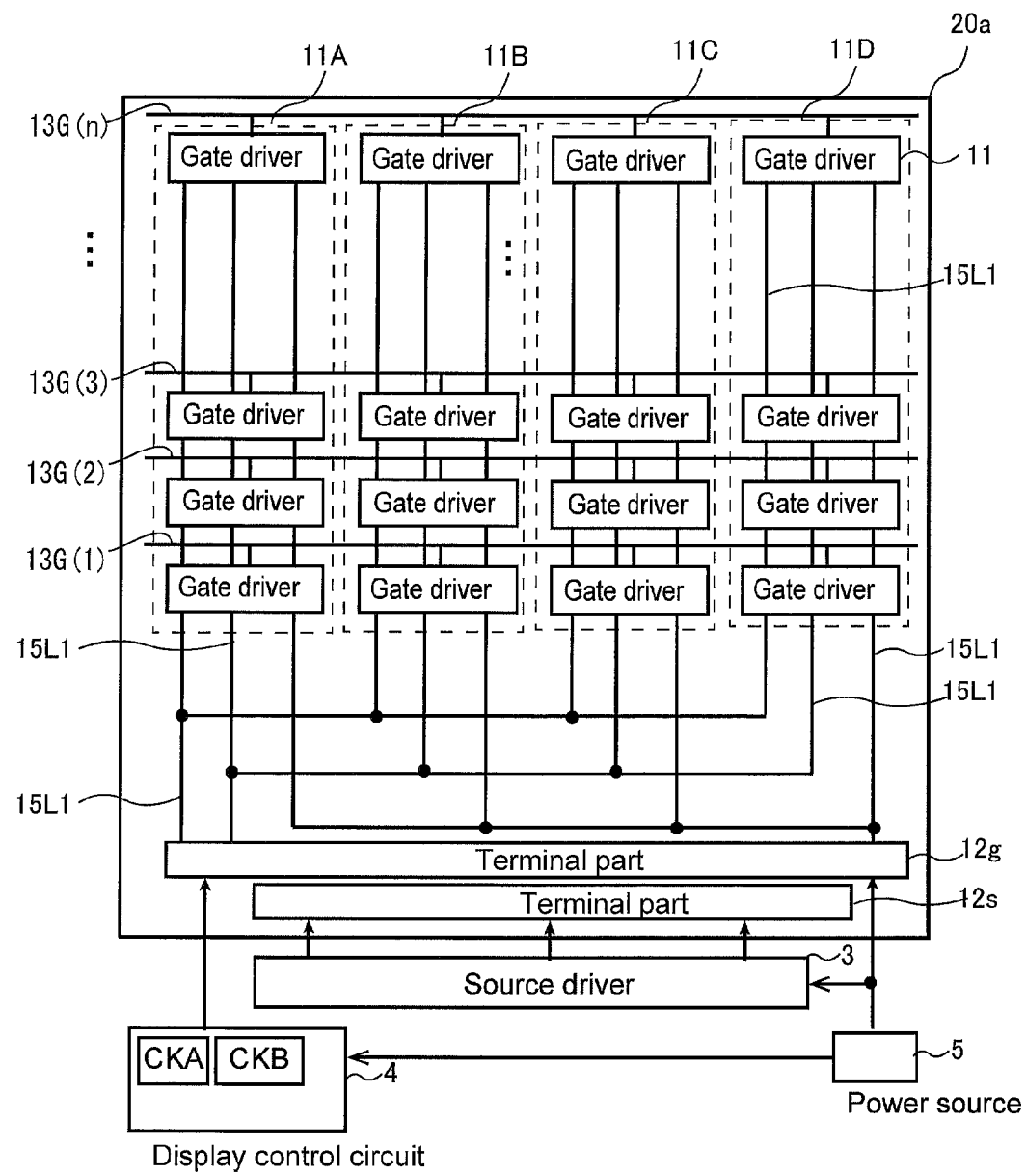
FIG. 4B is a schematic diagram illustrating a schematic configuration of the active matrix substrate illustrated in FIG. 2.

FIG. 4B is a top view illustrating schematic configurations of parts connected with the active matrix substrate 20a, with the illustration of the source lines 15S on the active matrix substrate 20a illustrated in FIG. 4A being omitted. As illustrated in FIG. 4B, on the active matrix substrate 20a, in a region outside the display region, on the side where the source driver 3 is provided, a terminal part 12g is formed. The terminal part 12g is connected with the display control circuit 4 and the power source 5. The terminal part 12g receives signals such as the control signals (CKA, CKB) and the power source voltage signals output from the display control circuit 4 and the power source 5. The signals such as the control signals (CKA, CKB) and the power source voltage signal input to the terminal part 12g are supplied via the line 15L1 to the gate driver groups 11A, 11B, 11C, and 11D.

Each of the gate driver groups 11A, 11B, 11C, 11D includes gate drivers provided in the same column in the display region. Hereinafter, when the gate drivers in these gate driver groups are not distinguished, the gate drivers are referred to as the "gate driver 11". In this example, four gate drivers 11 are connected to one gate line 13G. The gate drivers 11 are provided between the gate lines 13G. The gate drivers 11 are connected with the other gate drivers 11 arranged in the same column via the lines 15L1. The gate driver 11 receives signals supplied from the terminal part 12g via the lines 15L1. The gate driver 11 outputs a voltage signal representing either a selected state or a non-selected state to the gate line 13G to which the gate driver is connected, and at the same time, outputs the voltage signal to the next gate line 13G. In the following description, voltage signals corresponding to the selected state and the non-selected state are referred to as scanning signals in some cases. The state where the gate line 13G is selected is referred to as "driving of the gate line 13G".

The gate drivers 11 connected to the same gate line 13G are in synchronization with one another, and the one gate line 13G is simultaneously driven by the scanning signal output from these gate drivers 11. In the present embodiment, with respect to one gate line 13G, a plurality of the gate drivers 11 are connected at approximately equal intervals to the gate line 13G.

Further, in the active matrix substrate 20a, in a region outside the display region, on the side where the source driver 3 is provided, a terminal part 12g is formed that connects the source driver 3 and the source lines 15S (see FIG. 3). The source driver 3 outputs data signals to the source lines 15S, according to control signals input from the display control circuit 4.

Figure 5:
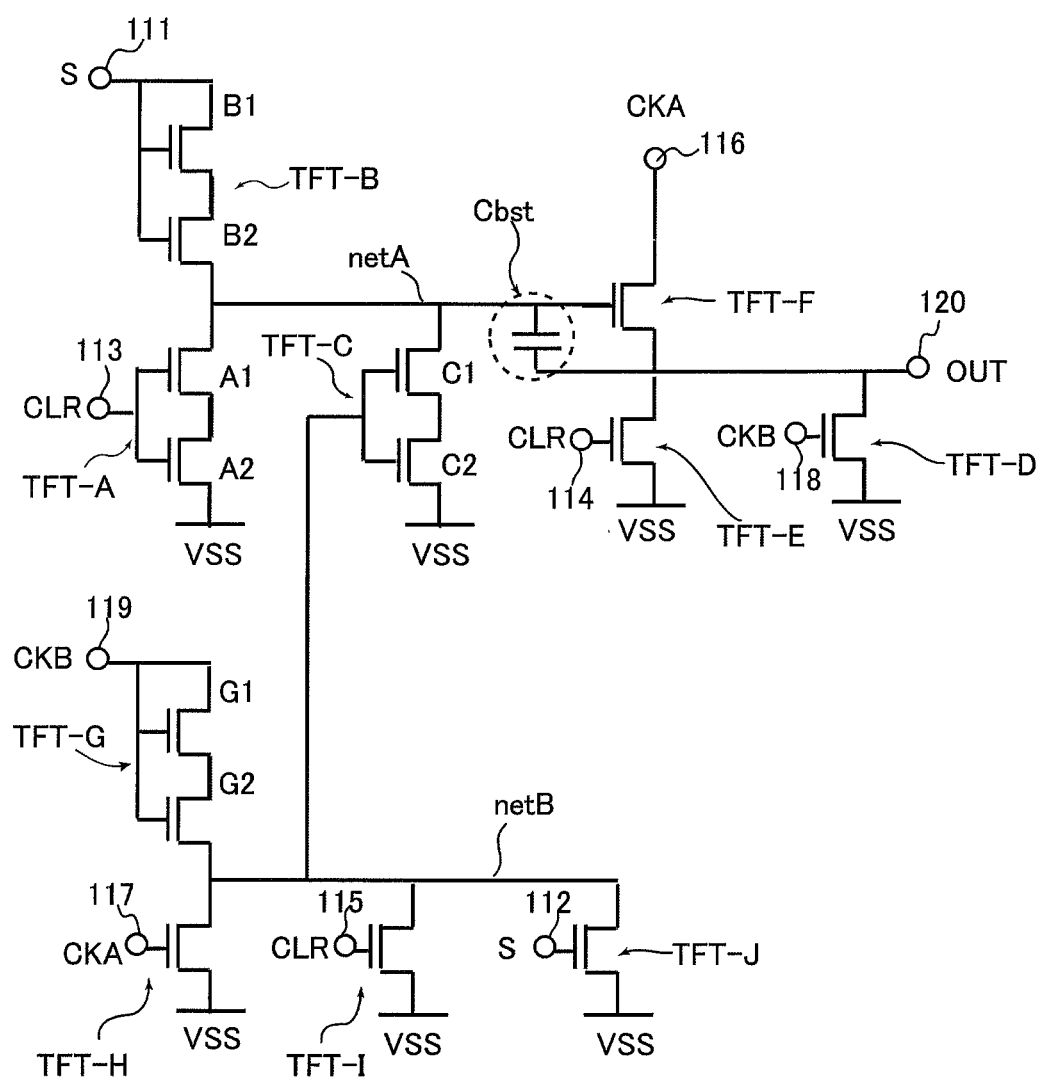
FIG. 5 illustrates an example of an equivalent circuit of a gate driver illustrated in FIG. 4B.

Next, the configuration of the gate driver 11 is described. FIG. 5 illustrates an exemplary equivalent circuit of the gate driver 11 that is arranged between the gate line 13G(n-1) and the gate line 13G(n-2), and drives the gate line 13G(n-1). As illustrated in FIG. 5, the gate driver 11 includes TFTs-A to -J formed with thin film transistors (TFT) as switching elements, a capacitor Cbst, terminals 111 to 120, and a terminal group to which a low-level power source voltage signal is input.

The terminals 111, 112 receive set signals (S) via the gate line 13G(n-2) of the previous stage. It should be noted that the terminals 111, 112 of the gate driver 11 connected to the gate line 13G(1) receive a gate start pulse signal (S) output from the display control circuit 4. The terminals 113 to 115 receive a reset signal (CLR) output from the display control circuit 4. The terminals 116, 117 receive the clock signal (CKA) input thereto. The terminals 118, 119 receive the clock signal (CKB) input thereto. The terminal 120 outputs the set signal (OUT) to the next gate line 13G.

Figure 10:
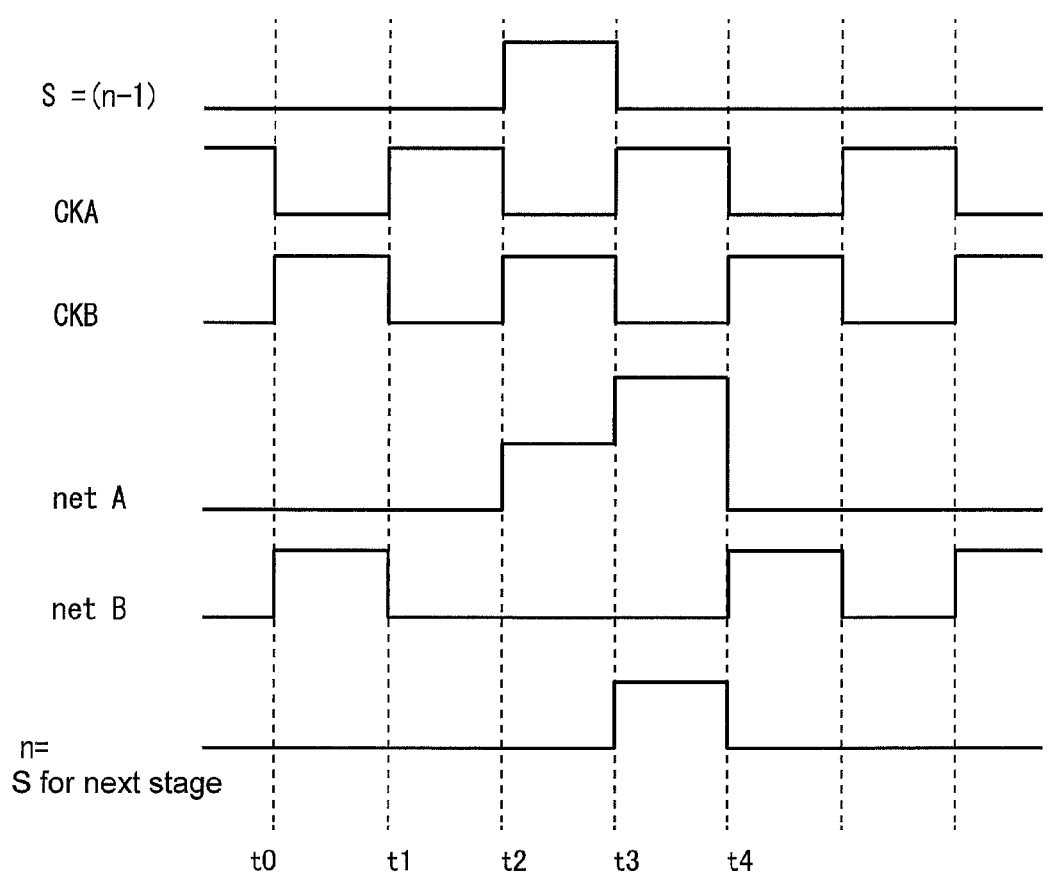
FIG. 10 is a timing chart illustrating an operation of the gate driver illustrated in FIG. 5 for scanning the gate line.

The clock signal (CKA) and the clock signal (CKB) are two-phase clock signals having phases that are inverted every horizontal scanning period (see FIG. 10). FIG. 5 illustrates an example of the gate driver 11 that drives the gate line 13G(n-1), but in the case of the next gate driver 11 that drives the gate line 13G(n), the terminals 116, 117 thereof receive the clock signal (CKB), and the terminals 118, 119 of the gate driver 11 receive the clock signal (CKA). In other words, the terminals 116 and 117 as well as the terminals 118 and 119 of each gate driver 11 receive clock signals having phases opposite to those of the clock signals that the gate driver 11 of the adjacent row receives.

In FIG. 5, a line to which the source terminal of the TFT-B, the drain terminal of the TFT-A, the source terminal of the TFT-C, and the gate terminal of the TFT-F are connected is referred to as a "net A". A line to which the gate terminal of the TFT-C, the source terminal of the TFT-G, the drain terminal of the TFT-H, the source terminal of the TFT-I, and the source terminal of the TFT-J are connected is referred to as a "net B".

The TFT-A is formed with two TFTs (A1, A2) connected in series. Each gate terminal of the TFT-A is connected with the terminal 113, the drain terminal of TFT-A1 is connected with the net A, and the source terminal of the TFT-A2 is connected to a power source voltage terminal VSS.

The TFT-B is formed with two TFTs (B1, B2) connected in series. Each gate terminal of the TFT-B and the drain terminal of the TFT-B1 are connected with the terminal 111 (diode connection), and the source terminal of the TFT-B2 is connected to the net A.

The TFT-C is formed with two TFTs (C1, C2) connected in series. Each gate terminal of the TFT-C is connected with the net B, the drain terminal of the TFT-C1 is connected with the net A, and the source terminal of the TFT-C2 is connected to the power source voltage terminal VSS.

Regarding the capacitor Cbst, one of electrodes thereof is connected with the net A, and the other electrode thereof is connected with the terminal 120.

Regarding the TFT-D, the gate terminal thereof is connected with the terminal 118, the drain terminal thereof is connected with the terminal 120, and the source terminal thereof is connected to the power source voltage terminal VSS.

Regarding the TFT-E, the gate terminal thereof is connected with the terminal 114, the drain terminal thereof is connected with the terminal 120, and the source terminal thereof is connected to the power source voltage terminal VSS.

Regarding the TFT-F, the gate terminal thereof is connected with the net A, the drain terminal thereof is connected with the terminal 116, and the source terminal thereof is connected with the output terminal 120.

The TFT-G is formed with two TFTs (G1, G2) connected in series. Each gate terminal of the TFT-G and the drain terminal of the TFT-G1 are connected with the terminal 119 (diode connection), and the source terminal of the TFT-G2 is connected to the net B.

Regarding the TFT-H, the gate terminal thereof is connected with the terminal 117, the drain terminal thereof is connected with the net B, and the source terminal thereof is connected to the power source voltage terminal VSS.

Regarding the TFT-I, the gate terminal thereof is connected with the terminal 115, the drain terminal thereof is connected with the net B, and the source terminal thereof is connected to the power source voltage terminal VSS.

Regarding the TFT-J, the gate terminal thereof is connected with the terminal 112, the drain terminal thereof is connected with the net B, and the source terminal thereof is connected to the power source voltage terminal VSS.

(Overall Layout of Gate Driver)

Figure 6A:
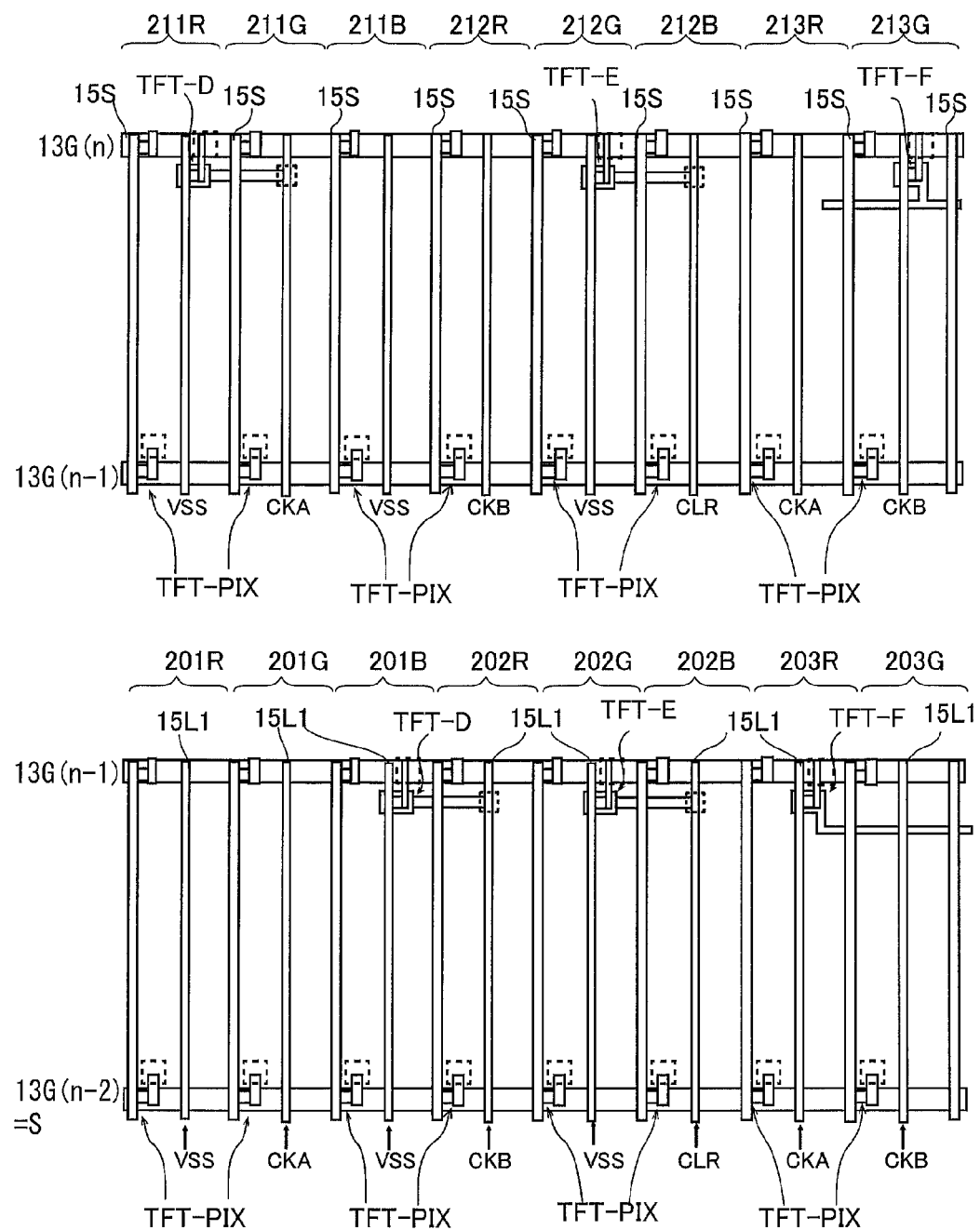
FIG. 6A is a schematic diagram illustrating an example of arrangement of the gate driver illustrated in FIG. 4B in the display region.
Figure 6B:
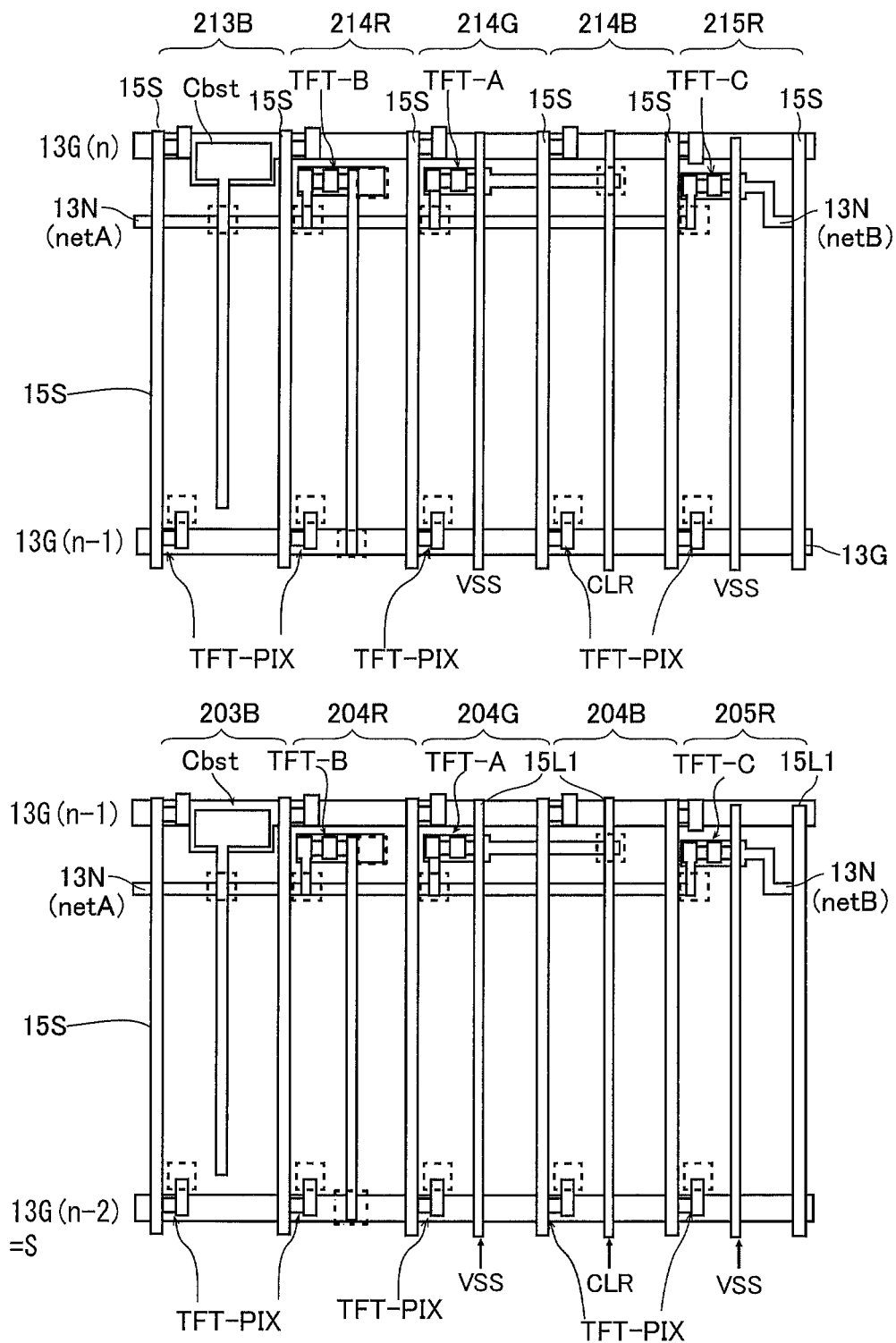
FIG. 6B is a schematic diagram illustrating an example of arrangement of the gate driver illustrated in FIG. 4B in the display region.
Figure 6C:
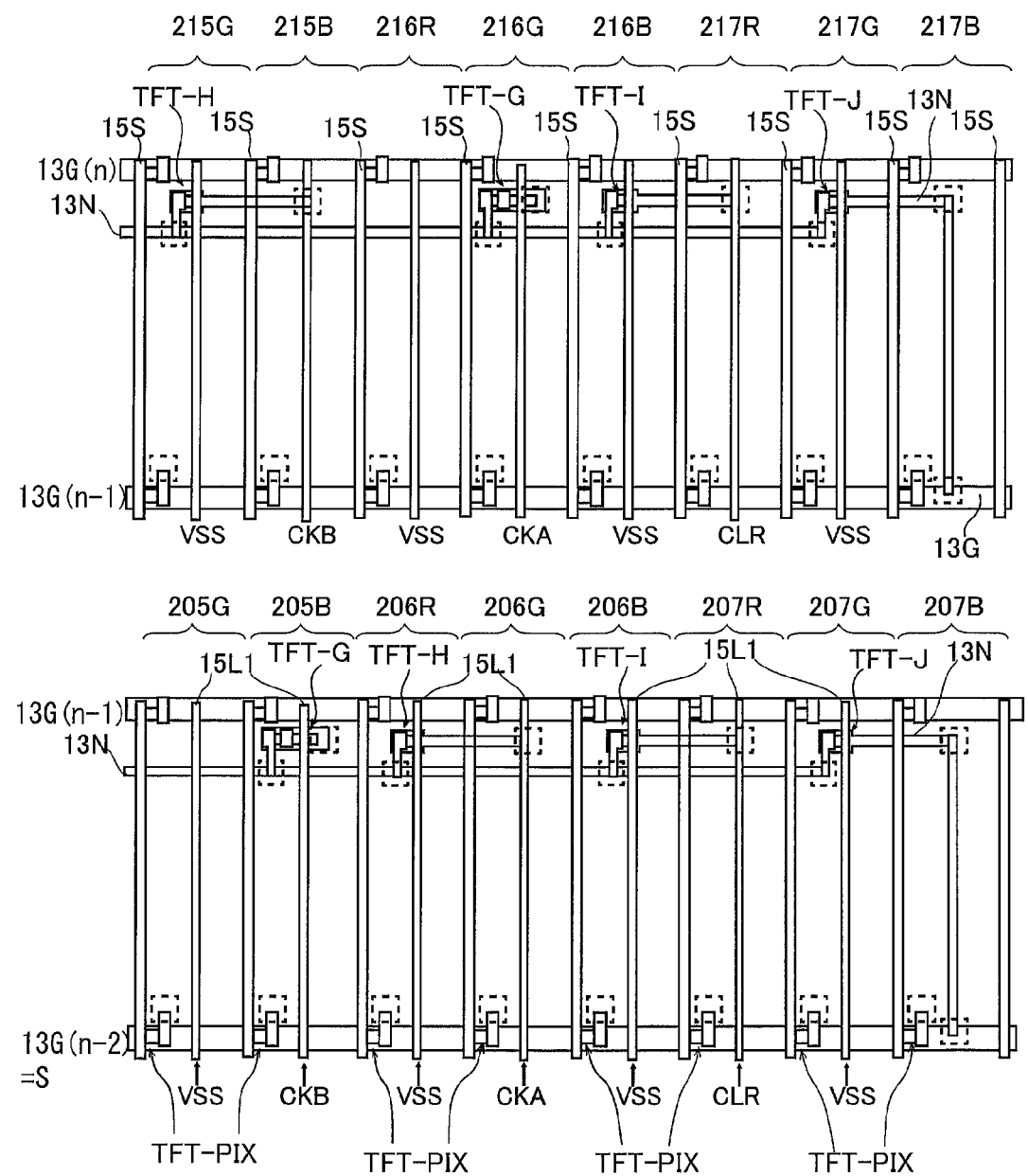
FIG. 6C is a schematic diagram illustrating an example of arrangement of the gate driver illustrated in FIG. 4B in the display region.

Next, the arrangement of respective elements of the gate driver 11 in the display region is described. FIGS. 6A to 6C illustrate an example of arrangement of one gate driver 11 provided between the gate line 13G(n) and the gate line 13G(n−1), and between the gate line 13G(n−1) and the gate line 13G(n−2). In FIGS. 6A to 6C, for convenience sake, pixel regions 211R to 217B between the gate line 13G(n) and the gate line 13G(n−1), and pixel regions 201R to 207B between the gate line 13G(n−1) and the gate line 13G(n−2), are illustrated as being separate from each other, but actually they overlap each other at the gate line 13G(n−1), whereby the upper and lower pixel regions are continuous. It should be noted that "R", "G", and "B" included in the reference symbols that indicate the pixel regions indicate the colors of the color filter 101 formed on the counter substrate 20b.

As illustrated in FIGS. 6A to 6C, in pixel regions 211R to 217B (hereinafter referred to as "upper pixel regions") and pixel regions 201R to 207B (hereinafter referred to as "lower pixel regions"), TFTs (hereinafter referred to as "TFTs-PIX") for displaying images are formed in vicinities of intersections between the source lines 15S and the gate lines 13G.

Besides, in the upper pixel region and the lower pixel region, elements (the TFT-A to TFT-J, and the capacitor cbst) composing one gate driver 11 are distributedly arranged. Among these pixel regions, in a pixel region where the switching elements receiving any signal among the clock signals (CKA, CKB), the reset signal (CLR), and the power source voltage signal (the TFTs-A, C to F, H to J, and the capacitor Cbst) are arranged, lines 15L1 for supplying these signals are formed. The lines 15L1 are formed over the upper pixel region and the lower pixel region so as to be approximately parallel with the source lines 15S. Further, in the upper pixel region and the lower pixel region, the lines 13N of the net A and the net B are formed. The lines 13N are formed over pixel regions in which elements (the TFTs-A to C, F, G to J, and the capacitor Cbst) that are connected to the net A and the net B are arranged, so as to be approximately parallel with the gate lines 13G in the upper pixel region and the lower pixel region.

In the present embodiment, the TFT-D, the TFT-F, the TFT-H, and the TFT-G, among the gate driver 11, are arranged so that the clock signals supplied thereto have phases opposite to the clock signals supplied to these TFTs of the gate driver 11 of the adjacent row, respectively. In other words, the TFT-D, the TFT-F, the TFT-H, and the TFT-G are arranged in pixel regions displaced in the horizontal direction with respect to pixel regions where these TFTs of the adjacent row are formed.

More specifically, as illustrated in FIG. 6A, while the TFT-D in the upper pixel region is formed in the pixel regions 211R and 211G, the TFT-D in the lower pixel region is formed in the pixel regions 201B and 202R. While the TFT-F in the upper pixel region is formed in the pixel region 213G, the TFT-F in the lower pixel region is formed in the pixel region 203R. Further, as illustrated in FIG. 6C, while the TFT-H in the upper pixel region is formed in the pixel regions 215G and 215B, the TFT-H in the lower pixel region is formed in the pixel regions 206R and 206G. While the TFT-G in the upper pixel region is formed in the pixel region 216G, the TFT-G in the lower pixel region is formed in the pixel region 205B. With this configuration, the clock signal (CKA) is supplied to the TFT-D in the upper pixel region, and the clock signal (CKB) having a phase opposite to that of the clock signal (CKA) is supplied to the TFT-D in the lower pixel region. Regarding the TFT-F, the TFT-H, and TFT as well, clock signals having opposite phases (CKA or CKB) are supplied to the upper pixel region and the lower pixel region, respectively, as illustrated in FIGS. 6A and 6C.

Further, the TFT-B and TFT-J in the upper pixel region are connected to the gate line 13G(n−1), and the TFT-B and the TFT-J in the lower pixel region are connected to the gate line 13G(n−2). The TFT-D and the TFT-F in the upper pixel region are connected to the gate line 13G(n), and the TFT-D and TFT-F in the lower pixel region are connected to the gate line 13G(n−1). The gate driver 11 arranged in the lower pixel region receive the set signal (S) via the gate line 13G(n−2), and outputs the set signal (S) to the gate line 13G(n), thereby driving the gate line 13G(n−1). The gate driver 11 arranged in the upper pixel region receives the set signal (S) via the gate line 13G(n−1), outputs the set signal (S) to the gate line 13G(n+1), thereby driving the gate line 13G(n).

Figure 7:
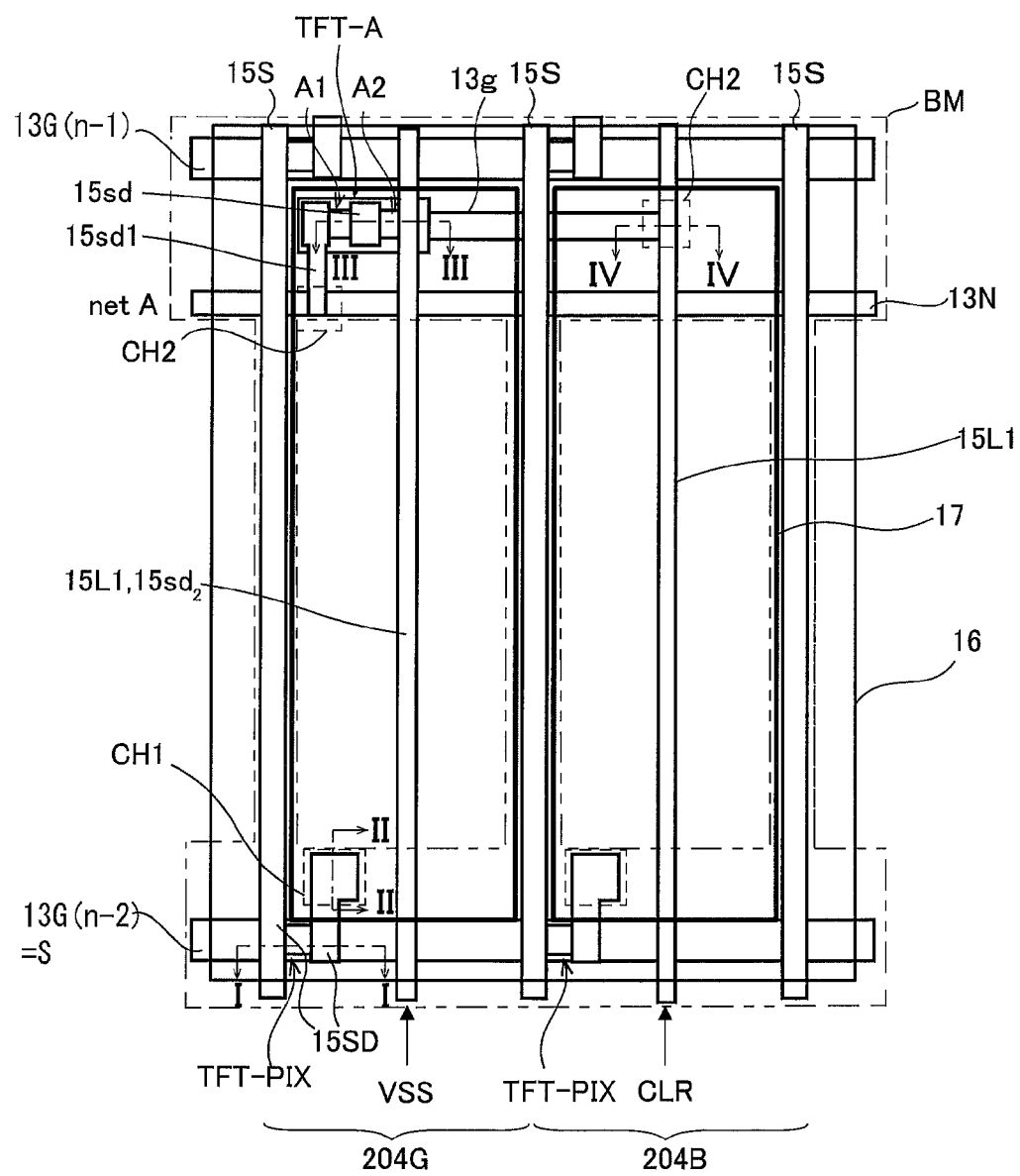
FIG. 7 is an enlarged plan view illustrating pixel regions where the TFT-A illustrated in FIG. 6B is formed.

Next, a specific method of connecting the elements composing the gate driver 11 is described. FIG. 7 is an enlarged plan view illustrating portions of the pixel regions 204G and 204B in which the TFT-A illustrated in FIG. 6B is formed. Since the TFT-A and the TFTs-H, I, J are formed using two pixel regions and a common connection method is used, the description is made with reference to the TFT-A. In FIG. 7, the region BM indicated by the alternate long and two short dashed lines is a region that is light-shielded by the black matrix BM of the counter substrate 20b (hereinafter referred to as a "light-shielded region BM"). The light-shielded region BM includes regions where the gate lines 13G, the elements composing the gate drivers 11, and the source lines 15S are formed.

As illustrated in FIG. 7, in the vicinities of intersections between the gate lines 13G and the source lines 15S, TFTs-PIX for image display are formed. The TFT-PIX and the pixel electrode 17 are connected at a contact portion CH1. Further, in the pixel region, the line 15L1 is formed so as to be approximately parallel with the source line 15S and to intersect the gate line 13G. To the line 15L1 in the pixel region 204G, the power source voltage signal (VSS) is supplied, and to the line 15L1 in the pixel region 204B, the reset signal (CLR) is supplied.

As illustrated in FIG. 7, the gate terminal 13g of the TFT-A is formed from the pixel region 204B to the pixel region 204G. In the pixel regions 204G and 204B, the source line 15S and the line 15L1 intersect, and the line 13N is formed so as to be approximately parallel with the gate line 13G. The line 13N is the above-mentioned line of the net A and the net B. The TFT-A is connected with the line 15L1 at a contact portion CH2 of the pixel region 204B, and is connected with the line 13N at a contact portion CH2 of the pixel region 204G. Further, in the present embodiment, a shielding layer 16 is formed between the pixel electrodes 17 on one hand, and the TFTs-A, the lines 13N, and the lines 15L1 on the other hand.

Figure 8A:
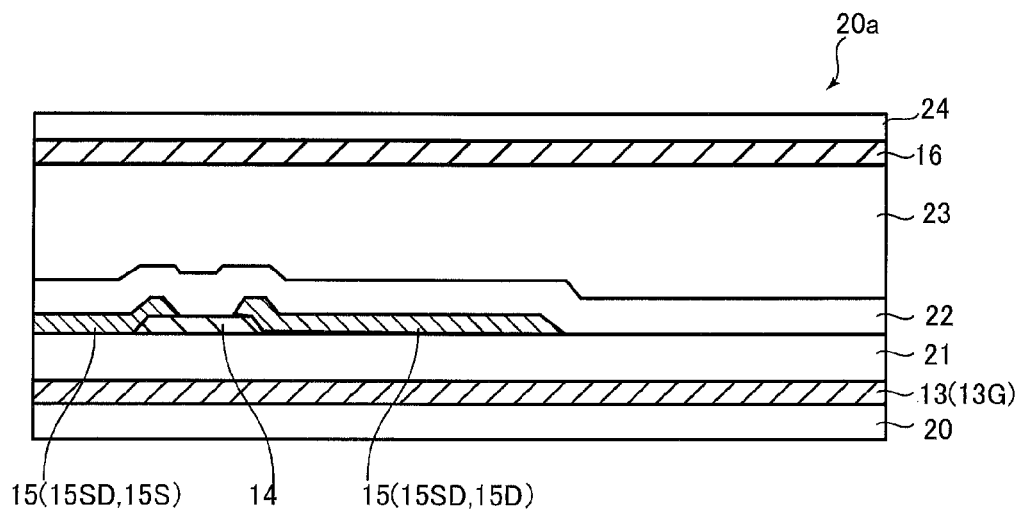
FIG. 8A is a schematic diagram illustrating a cross section of a portion of the TFT-PIX, taken along the line I-I in FIG. 7.
Figure 8B:
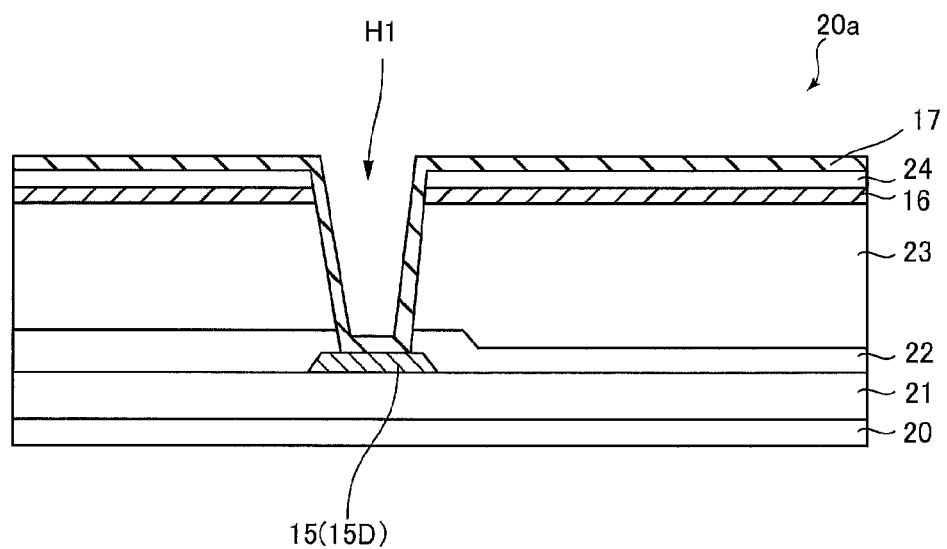
FIG. 8B is a schematic diagram illustrating a cross section of a contact portion CH1, taken along the line II-II in FIG. 7.

Here, a cross-sectional view of the portion of the TFT-PIX in FIG. 7, taken along the line I-I, is illustrated in FIG. 8A, and a cross-sectional view of the contact portion CH1, taken along a line II-II, is illustrated in FIG. 8B. Further, a cross-sectional view of the portion of the TFT-A in FIG. 7, taken along the line III-III, is illustrated in FIG. 8C, and a cross-sectional view of the contact portion CH2, taken along the line IV-IV, is illustrated in FIG. 8D.

Figure 8C:
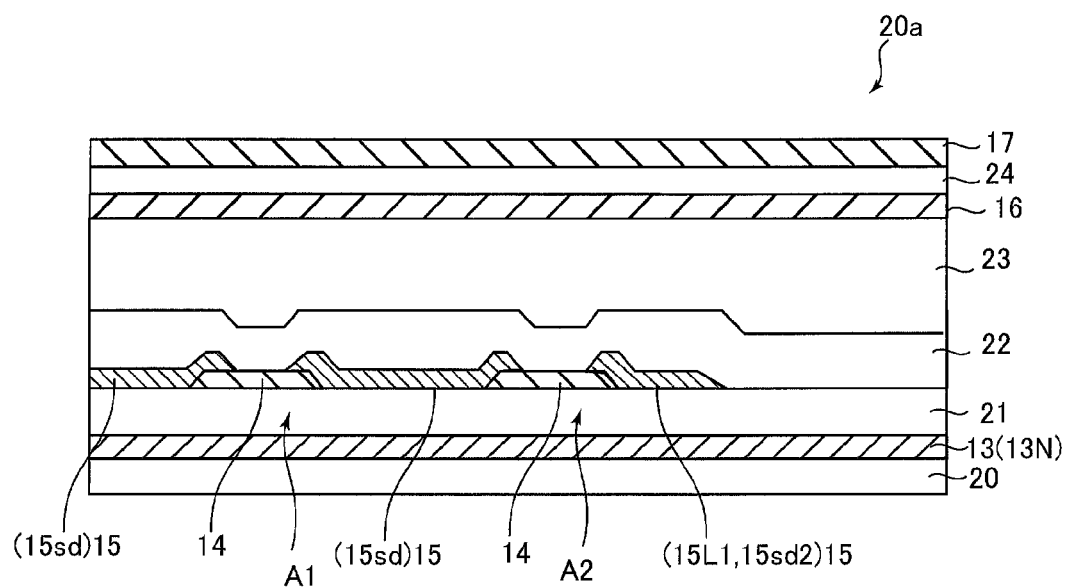
FIG. 8C is a schematic diagram illustrating a cross section of a portion of the TFT-A, taken along the line III-III in FIG. 7.
Figure 8D:
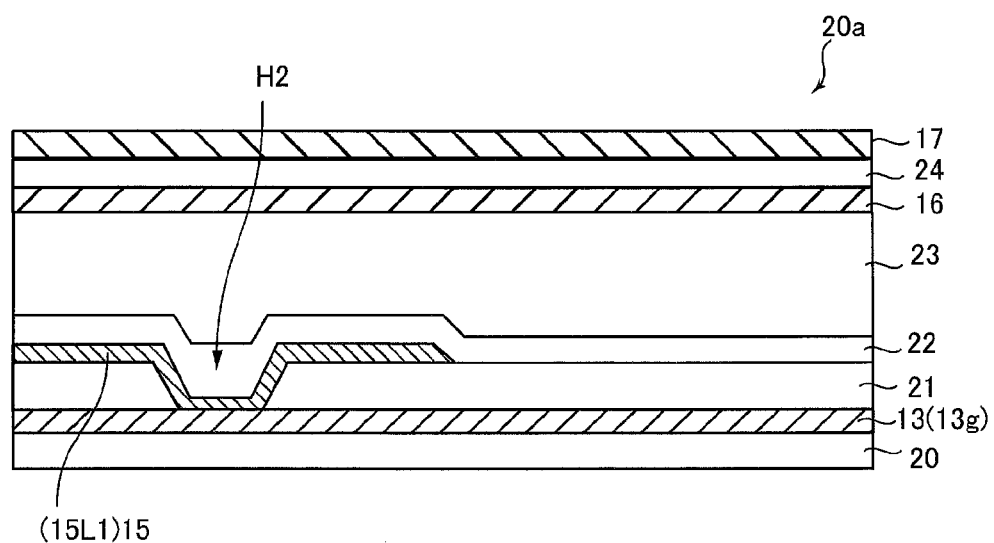
FIG. 8D is a schematic diagram illustrating a cross section of a contact portion CH2, taken along the line IV-IV in FIG. 7.

As illustrated in FIGS. 8A, 8C, and 8D, the gate line layer 13 is formed on the substrate 20, whereby the gate lines 13G, the gate terminals 13g of the TFTs-A, and the lines 13N are simultaneously formed. As illustrated in FIGS. 8A and 8C, in a layer above the gate line layer 13, in portions where the TFTs-PIX are formed and in portions where the TFTs-A are formed, a semiconductor layer 14 made of an oxide semiconductor is formed, with a gate insulating film 21 being interposed therebetween. Besides, on the substrate 20 on which the semiconductor layer 14 is formed, source line layers 15 are formed so as to be separated from each other above the semiconductor layer 14. With the source line layers 15 thus formed, as illustrated in FIGS. 8A to 8C, the source lines 15S, source-drain terminals 15SD of the TFTs-PIX, source-drain terminals 15sd (including the source-drain terminals 15sd1, 15sd2) of the TFTs-A, and the lines 15L1 are simultaneously formed.

As illustrated in FIG. 8D, at the contact portion CH2 in the pixel region 204B, a contact hole H2 is formed in the gate insulating film 21 so as to pass therethrough to the surface of the gate layer 13. The source line layer 15(15L1) is formed on the gate insulating film 21 so as to be in contact with the gate line layer 13(13g) at the contact hole H2. This causes the gate terminal 13g of the TFT-A and the line 15L1 to be connected at the contact portion CH2 in the pixel region 204B. Further, at the contact portion CH2 in the pixel region 204G as well, similarly, the drain terminal 15sd1 on the A1 side of the TFT-A formed with the source line layer 15, and the line 13N formed with the gate line layer 13 are connected. With this, the TFT-A is connected with the net A, and the reset signal (CLR) is supplied via the line 15L1.

Further, as illustrated in FIGS. 8A to 8D, above the source line layer 15, a protection layer 22 and a protection layer 23 are laminated so as to cover the source line layer 15. The protection layer 22 is formed with an inorganic insulating film made of, for example, SiO2. The protection layer 23 is formed with an organic insulating film such as, for example, a positive-type photosensitive resin film. Further, as illustrated in FIGS. 8A to 8D, a shielding layer 16 is formed above the protection layer 23. The shielding layer 16 is formed with, for example, a transparent conductive film made of, for example, ITO. Above the shielding layer 16, an interlayer insulating film 24 is formed, which is formed with an inorganic insulating film made of, for example, SiO2. Above the interlayer insulating film 24, as illustrated in FIGS. 8C and 8D, a pixel electrode 17 is formed, which is formed with a transparent conductive film made of ITO or the like.

As illustrated in FIG. 8B, at the contact portion CH1, above the drain terminal 15D of the TFT-PIX, a contact hole H1 is formed that passes through the interlayer insulating film 24, the shielding layer 16, and the protection layers 22, 23. The pixel electrode 17 is formed above the interlayer insulating film 24 so as to be in contact with the drain terminal 15D at the contact hole H1. With the shielding layer 16 thus formed, a capacitor Cs is formed between the pixel electrode 17 and the shielding layer 16, and the capacitor Cs allows the potential of the pixel electrode 17 to be stabilized.

In this way, the TFT-A, as well as the line 13N and the line 15L1 that are connected with the TFT-A are formed over two pixel regions, which suppresses the reduction of the aperture ratio, as compared with the case where these are formed in one pixel region. Besides, as the shielding layer 16 is formed between the pixel electrodes 17 on one hand and the TFTs-A, the lines 13N, and the lines 15L1 on the other hand, interference between the TFTs-A and the like and the pixel electrodes 17 can be reduced.

(TFT-B)

Figure 9A:
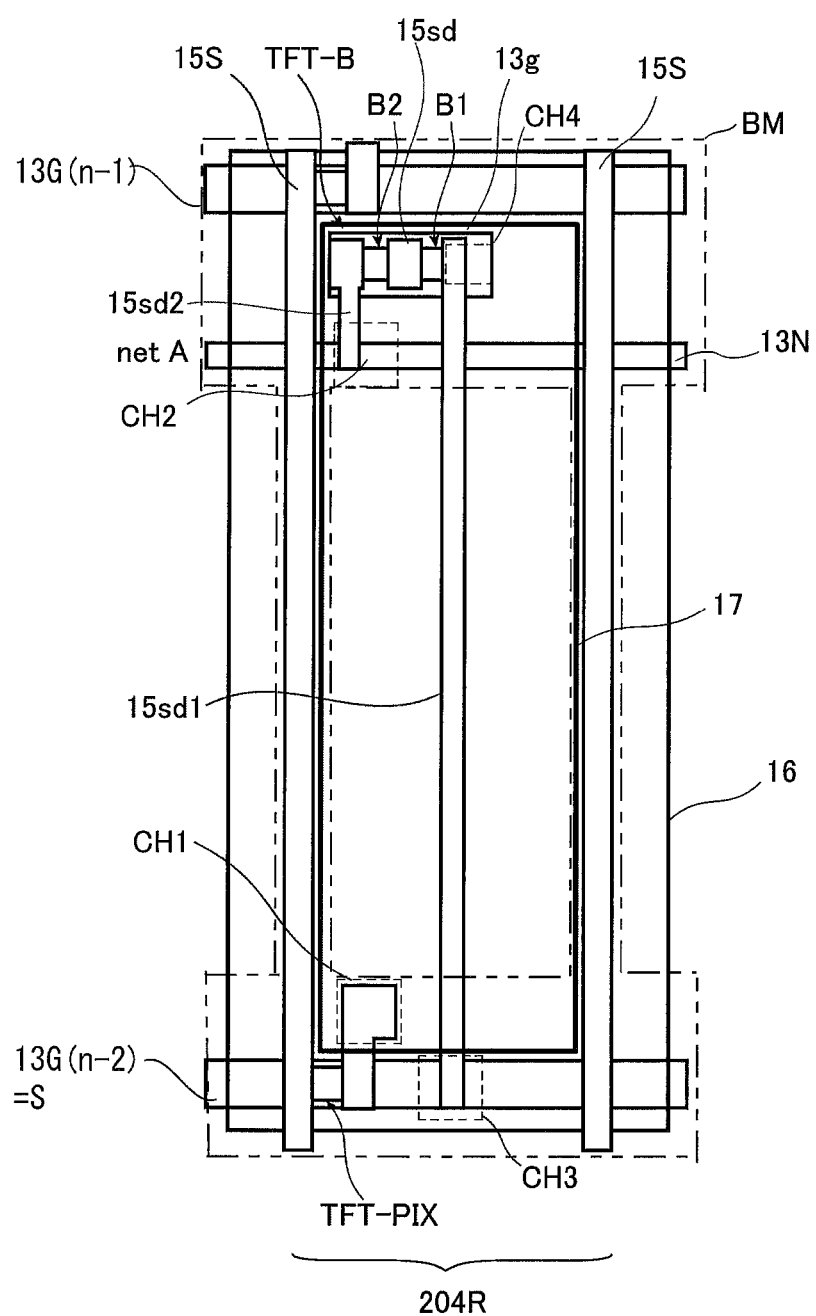
FIG. 9A is an enlarged plan view illustrating the pixel region 204R illustrated in FIG. 6B.

Next, the connection of the TFT-B is described. FIG. 9A is an enlarged plan view illustrating the pixel region 204R illustrated in FIG. 6B. As illustrated in FIG. 9A, in the pixel region 204R, as is the case with the pixel region 204G described above, the TFT-PIX and the pixel electrode 17 are connected with each other at the contact portion CH1. Further, the source-drain terminals 15sd (including the terminals 15sd1, 15sd2) of the TFT-B are formed with the source line layer 15. With the gate line layer 13 thus formed, the gate terminal 13g of the TFT-B, the gate line 13G(n-2) and the line 13N are simultaneously formed.

The drain terminal 15sd1 on the B1 side is formed so as to intersect the gate line 13G(n-2) and the line 13N. At each of the contact portions CH3 and CH4, as is the case with the contact portion CH2 mentioned above, a contact hole H2 for connecting the gate line layer 13 and the source line layer 15 is formed in the gate insulating film 21.

The drain terminal 15sd1 is connected with the gate line 13G(n-2) at the contact portion CH3, and is connected with the gate terminal 13g at the contact portion CH4. Further, the source terminal 15sd2 on the B2 side is connected with the line 13N at the contact portion CH2. With this, the TFT-B is connected to the net A, and receives the set signal (S) via the gate line 13G(n-2).

(TFT-C)

Figure 9B:
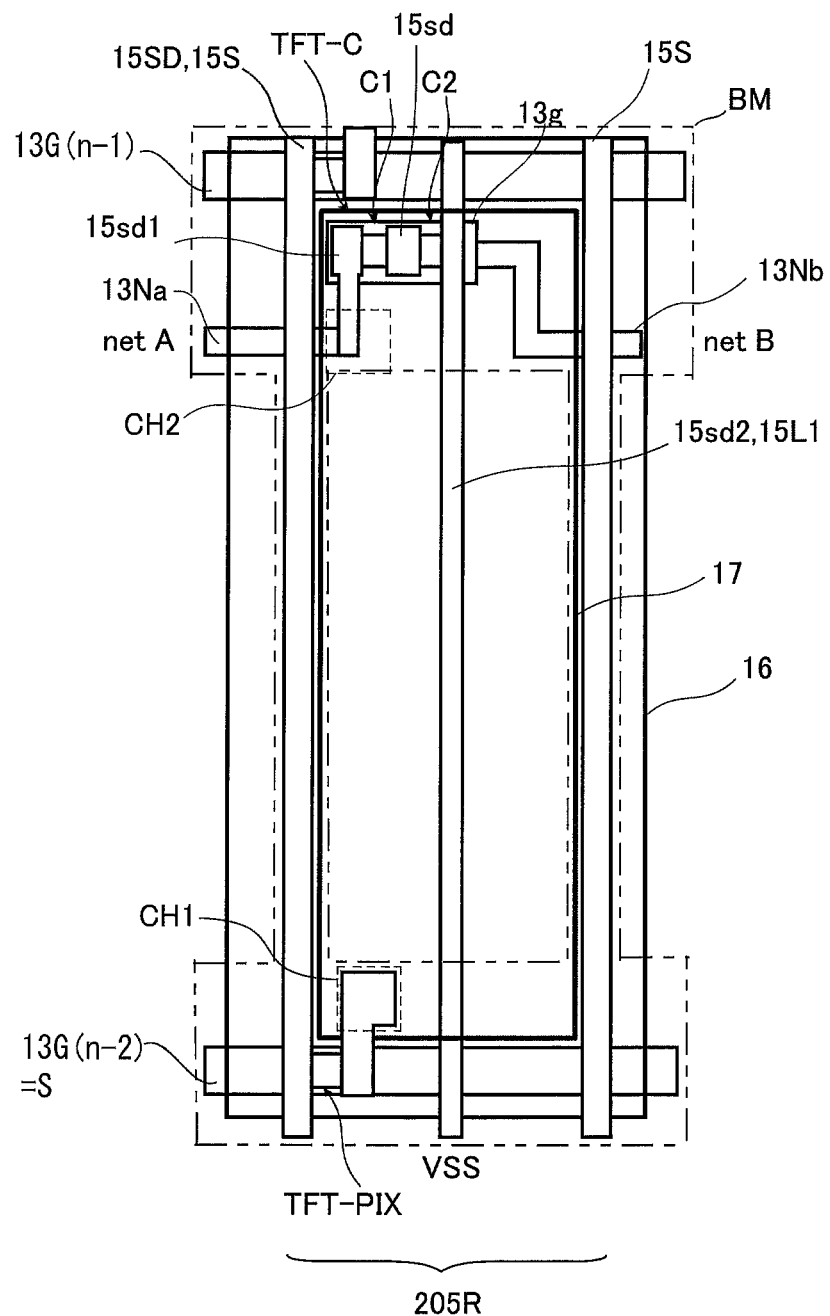
FIG. 9B is an enlarged plan view illustrating the pixel region 205R illustrated in FIG. 6B.

Next, the connection of the TFT-C is described. FIG. 9B is an enlarged plan view illustrating the pixel region 205R illustrated in FIG. 6B. As illustrated in FIG. 9B, in the pixel region 205R, as is the case with the pixel regions 204G and 204B mentioned above, the TFT-PIX and the pixel electrode 17 are connected at the contact portion CH1. Further, with the gate line layer 13 thus formed, the gate terminal 13g of the TFT-C, the gate line 13G, and the lines 13N (13Na, 13Nb) are simultaneously formed. With the source line layer 15 thus formed, the source-drain terminals 15sd (including the source-drain terminal 15sd1, 15sd2) of the TFT-C, and the lines 15L1 are simultaneously formed. At the contact portion CH2, the drain terminal 15sd1 on the C1 side and the line 13Na are connected. The TFT-C is connected with the net A by the line 13Na, and is connected with the net B by the line 13Nb. Further, to the TFT-C, the power source voltage signal (VSS) is supplied, via the line 15L1.

(TFT-F)

Figure 9C:
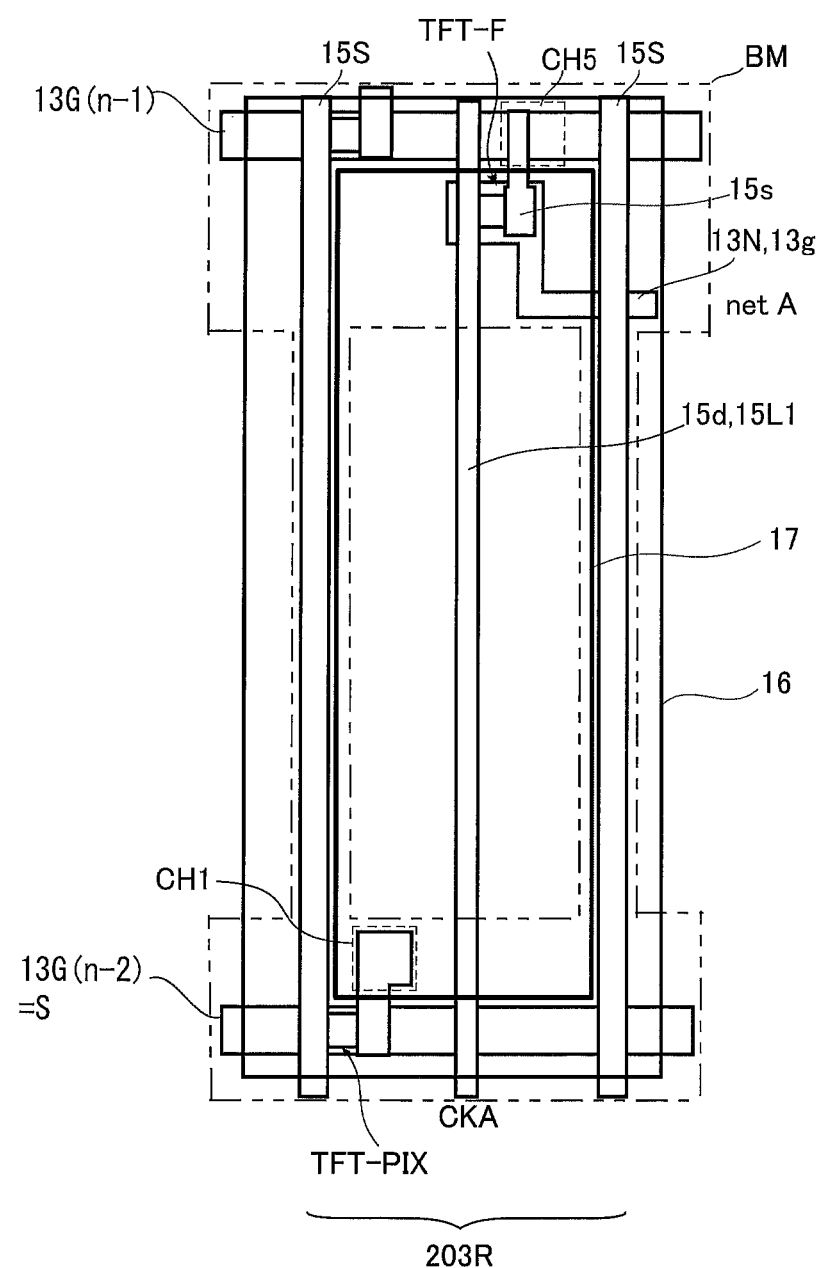
FIG. 9C is an enlarged plan view illustrating the pixel region 203R illustrated in FIG. 6A.

Next, the connection of the TFT-F is described. FIG. 9C is an enlarged plan view illustrating the pixel region 203R illustrated in FIG. 6A. As illustrated in FIG. 9C, in the pixel region 203R, as is the case with the pixel regions 204G and 204B, the TFT-PIX and the pixel electrode 17 are connected, at the contact portion CH1. Further, with the gate line layer 13 thus formed, the gate terminal 13g of the TFT-C, the gate line 13G, and the line 13N are simultaneously formed. With the source line layer 15 thus formed, the source terminal 15s and the drain terminal 15d of the TFT-F as well as the line 15L1 are simultaneously formed.

At the contact portion CH5, as is the case with the contact portion CH2 described above, a contact hole H2 for connecting the gate line layer 13 and the source line layer 15 is formed. At the contact portion CH5, the source terminal 15s of the TFT-F and the gate line 13G(n-1) are connected, and the gate terminal of the TFT-F is connected with the net A. To the drain terminal of the TFT-F, the clock signal (CKA) is supplied via the line 15L1. Further, the TFT-F outputs the scanning signal to the gate line 13G(n-1) via the contact portion CH5.

(TFT-G)

Figure 9D:
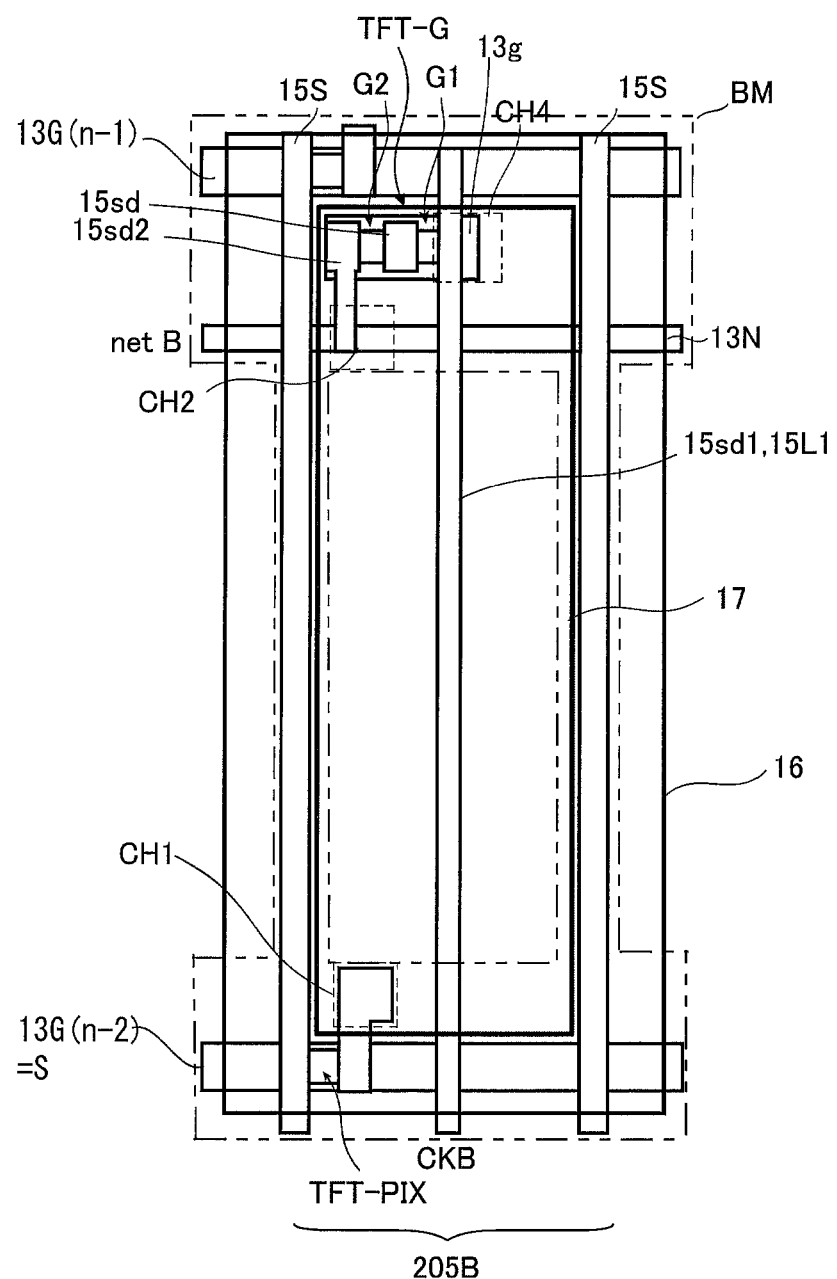
FIG. 9D is an enlarged plan view illustrating the pixel region 205B illustrated in FIG. 6C.

Next, the connection of the TFT-G is described. FIG. 9D is an enlarged plan view illustrating the pixel region 205B illustrated in FIG. 6C. As illustrated in FIG. 9D, in the pixel region 205B, as is the case with the pixel regions 204G and 204B described above, the TFT-PIX and the pixel electrode 17 are connected with each other, at the contact portion CH1. Further, with the gate line layer 13 thus formed, the gate terminal 13g of the TFT-G, the gate line 13G, and the line 13N are formed. With the source line layer 15 thus formed, the source-drain terminals 15sd (including the source-drain terminals 15sd1, 15sd2) of the TFT-G, and the line 15L1 are formed. At the contact portion CH2, the source terminal 15sd2 of the TFT-G, on the G2 side, is connected with the line 13N. The gate terminal 13g of the TFT-G is connected with the drain terminal 15sd1 on the G1 side and the line 15L1 at the contact portion CH4. With this, the TFT-G is connected with the net B, and the clock signal (CKB) is supplied via the line 15L1.

(Cbst)

Figure 9E:
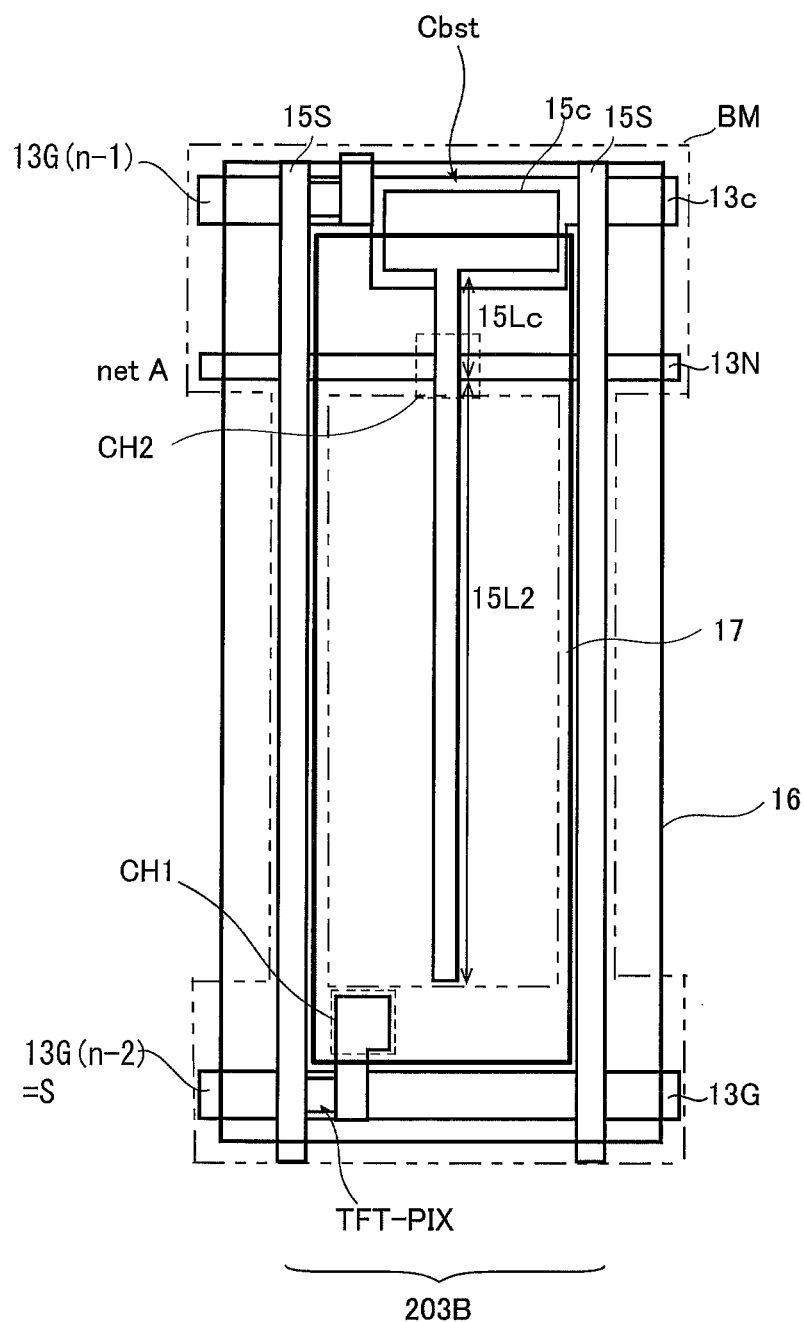
FIG. 9E is an enlarged plan view illustrating the pixel region 203B illustrated in FIG. 6B.

Next, the connection of the capacitor Cbst is described. FIG. 9E is an enlarged plan view illustrating the pixel region 203B illustrated in FIG. 6B. In the pixel region 203B, as is the case with the pixel regions 204G and 204B, the TFT-PIX and the pixel electrode 17 are connected with each other at the contact portion CH1. Further, with the gate line layer 13 thus formed, one of electrode 13c composing the capacitor Cbst, the gate line 13G, and the line 13N are formed. With the source line layer 15 thus formed, the other electrode 15c of the capacitor Cbst, the connection part 15Lc, and the line 15L2 are formed. As illustrated in FIG. 9E, the connection part 15Lc, having a width approximately equal to the width of the line 13N, is formed so as to extend from the electrode 15c to the contact portion CH2, and is connected with the line 13N at the contact portion CH2. Further, the line 15L2 is formed so as to extend from the contact portion CH2 side end of the connection part 15Lc to vicinities of the contact portion CH1. In the present embodiment, the line 15L2 is formed with an intention to cause the pixel region where the capacitor Cbst is formed, and the pixel region where the other element is formed, to have identical aperture ratios. At the contact portion CH2, the electrode 15c is connected with the line 13N by the connection part 15Lc. This allows the capacitor Cbst to be connected with the net A.

(TFT-D, E)

Next, the connection of the TFT-D and the TFT-E is described. The TFT-D and the TFT-E, like the TFT-A described above, have gate terminals 13g each of which is formed over two adjacent pixel regions, and the gate terminal 13g is connected with the line 15L1 formed in one of the pixel regions. Since the TFT-D and the TFT-E are different only in the signal supplied to the gate terminal, the reset signal (CLR) or the clock signal (CKA), the following description describes the connection of the TFT-D.

Figure 9F:
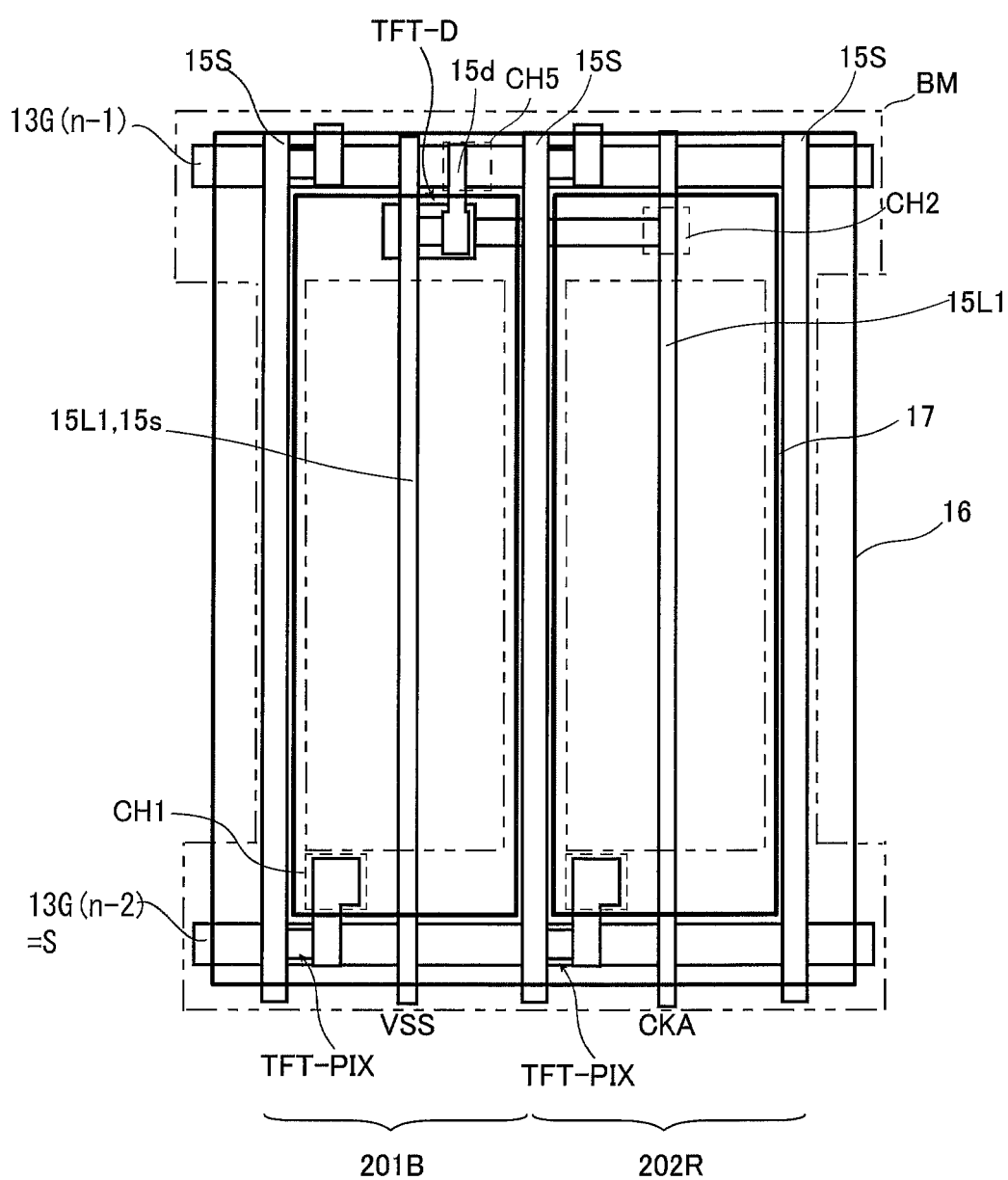
FIG. 9F is an enlarged plan view illustrating the pixel regions 201B and 202R illustrated in FIG. 6A.

FIG. 9F is an enlarged plan view illustrating the pixel regions 201B and 202R illustrated in FIG. 6A. In the pixel regions 201B and 202R, as is the case with the pixel regions 204G and 204B described above, the source terminal 15s and the drain terminal 15d of the TFT-D, and the line 15L1, are formed with the source line layer 15. The drain terminal 15d thereof is connected with the gate line 13G(n−1) at the contact portion CH5 in the pixel region 201R. The TFT-D is supplied with the power source voltage signal (VSS) and the clock signal (CKA) via the lines 15L1 in the pixel regions 201B and 202R, drives the gate line 13G(n−1) via the contact portion CH5 so as to output the set signal to the gate line 13G(n).

The foregoing description describes the configuration of the gate driver 11, and a connection example of elements that compose the gate driver 11. Descriptions are omitted regarding the pixel regions where the TFTs-B to -E, the TFT-F, the TFT-G, the capacitor Cbst, and the TFT-D are formed, but in the above-mentioned pixel regions as well, as is the case with the pixel region where the TFT-A is formed, the protection layers 22 and 23, the shielding layer 16, the interlayer insulating film 24, and the pixel electrode 17 are laminated above the source line layer 15.

(Operation of Gate Driver 11)

Next, the operation of one gate driver 11 is described with reference to FIGS. 5 to 10. FIG. 10 is a timing chart illustrating an operation of the gate driver 11 for scanning the gate line 13G. In FIG. 10, the period from t3 to t4 is a period while the gate line 13G(n) is selected. The clock signal (CKA) and the clock signal (CKB), having phases that are inverted every horizontal scanning period, which are supplied from the display control circuit 4, are input via the terminals 116 to 119 to the gate driver 11. Further, though illustration is omitted in FIG. 10, the reset signal (CLR), which is at the H (High) level for a certain set period every perpendicular scanning period, is input from the display control circuit 4 via the terminals 113 to 115 to the gate driver 11. Upon the input of the reset signal (CLR), the net A, the net B, and the gate line 13G make transition to the L (Low) level.

In a period from the time t0 to the time t1 in FIG. 10, the clock signal (CKA) at the L level is input to the terminals 116, 117, and the clock signal (CKB) at the H level is input to the terminals 118, 119. This causes the TFT-G to be turned ON, and causes the TFT-H to be turned OFF, thereby causing the net B to be charged to the H level. Besides, since the TFT-C and the TFT-D are turned ON and the TFT-F is turned OFF, the net A is charged to the power source voltage (VSS) at the L level, whereby a potential at the L level is output from the terminal 120.

Next, at the time t1, the clock signal (CKA) shifts to the H level and the clock signal (CKB) shifts to the L level, which causes the TFT-G to be turned OFF and causes the TFT-H to be turned ON, thereby causing the net B to be charged to the L level. Since the TFT-C and the TFT-D are turned OFF, the potential of the net A is maintained at the L level, and the potential at the L level is output from the terminal 120.

At the time t2, the clock signal (CKA) shifts to the L level, the clock signal (CKB) shifts to the H level, and the set signal (S) is input to the terminals 111, 112 via the gate line 13G(n−1). This causes the TFT-B to be turned ON, and causes the net A to be charged to the H level. Further, the TFT-J is turned ON, the TFT-G is turned ON, and the TFT-H is turned OFF, which causes the net B to be maintained at the L level. Since the TFT-C and the TFT-F are in the OFF state, the potential of the net A is maintained without dropping. During this period, since the TFT-D is turned ON, a potential at the L level is output from the terminal 120.

At the time t3, the clock signal (CKA) shifts to the H level and the clock signal (CKB) shifts to the L level, which causes the TFT-F to be turned ON and causes the TFT-D to be turned OFF. Since the capacitor Cbst is provided between the net A and the terminal 120, as the potential of the terminal 116 of the TFT-F rises, the net A is accordingly charged to a potential higher than the H level of the clock signal (CKA). During this period, since the TFT-G and the TFT-J are turned OFF and the TFT-H is turned ON, the potential of the net B is maintained at the L level. Since the TFT-C is in the OFF state, the potential of the net A does not drop, and the potential of the H level of the clock signal (CKA) is output from the terminal 120. This causes the gate line 13G(n) connected with the terminal 120 to be charged to the H level, thereby making transition to the selected state.

At the time t4, the clock signal (CKA) shifts to the L level and the clock signal (CKB) shifts to the H level, which causes the TFT-G to be turned ON and causes the TFT-H to be turned OFF, thereby causing the net B to be charged to the H level. This causes the TFT-C to be turned ON and causes the net A to be charged to the L level. During this period, since the TFT-D is turned ON and the TFT-F is turned OFF, a potential at the L level is output from the terminal 120, whereby the gate line 13G(n) is charged to the L level.

In this way, the set signal (S) is output from the terminal 120 of the gate driver 11 to the gate line 13G, thereby causing the gate line 13 to make transition to the selected state. The liquid crystal display device 1 sequentially scans the gate lines 13G using the gate drivers 11 connected to the gate lines 13G, and supplies data signal to the source lines 15S using the source driver 3, thereby causing an image to be displayed on the display panel 2.

Figure 11:
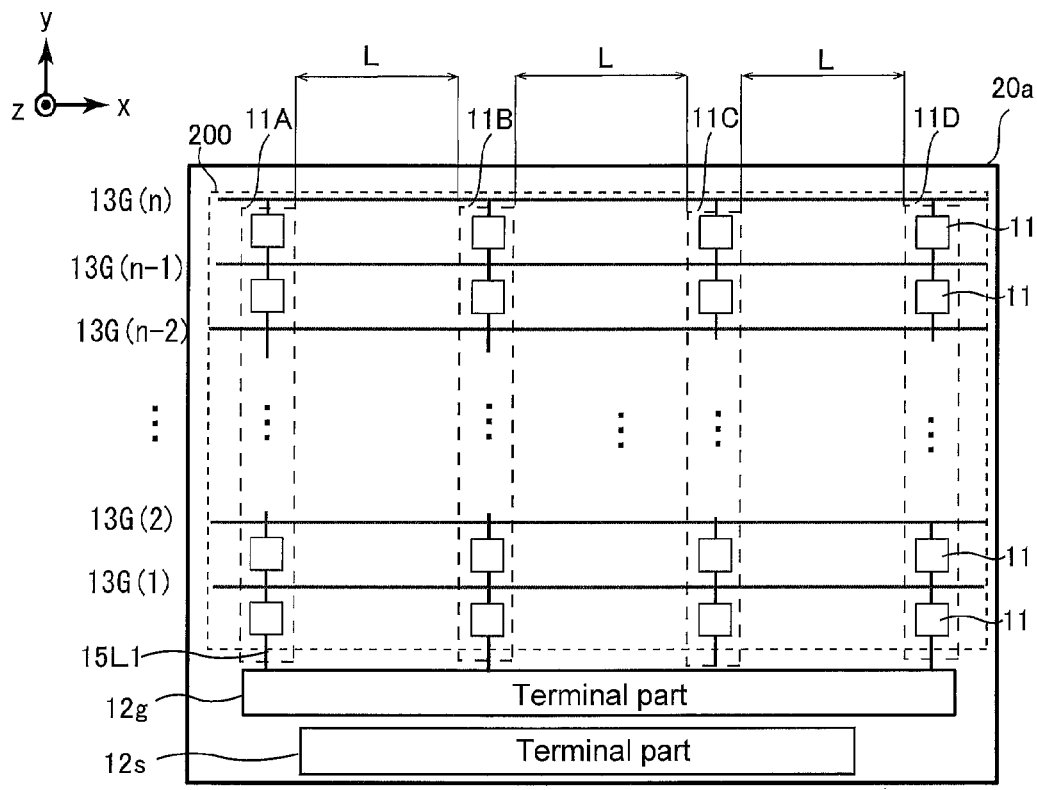
FIG. 11 is a simplified schematic diagram illustrating the schematic configuration of the active matrix substrate illustrated in FIG. 4B.

Next, pixel regions where no gate driver 11 is provided (hereinafter referred to as a "gate driver non-installation region") on the active matrix substrate 20a are described. FIG. 11 is a simplified schematic diagram illustrating the active matrix substrate 20a illustrated in FIG. 4B. The broken line frame 200 illustrated in FIG. 11 indicates a boundary between the display region and the outside of the display region.

As described above, one gate driver 11 is formed over a plurality of pixels in the same row. As illustrated in FIGS. 6A to 6C, respective gate driver installation regions of the gate drivers 11 in the gate driver group have equal widths in the x axis direction. Pixel regions in which the elements composing one gate driver 11 and the lines 15L1 for supplying control signals to the elements are arranged are referred to as a "gate driver installation region".

In the example illustrated in FIG. 11, the gate driver installation region for the gate driver group 11A and the gate driver installation region for the gate driver group 11B are separated from each other at a certain set distance L. Similarly, the gate driver installation region for the gate driver group 11B and the gate driver installation region for the gate driver group 11O are separated at the distance L, and so are the gate driver installation region for the gate driver group 11O and the gate driver installation region for the gate driver group 11D. As the present example, an example in which the distance between the gate driver installation regions is constant is described, but the distance between the gate driver installation regions does not have to be constant.

Figure 12:
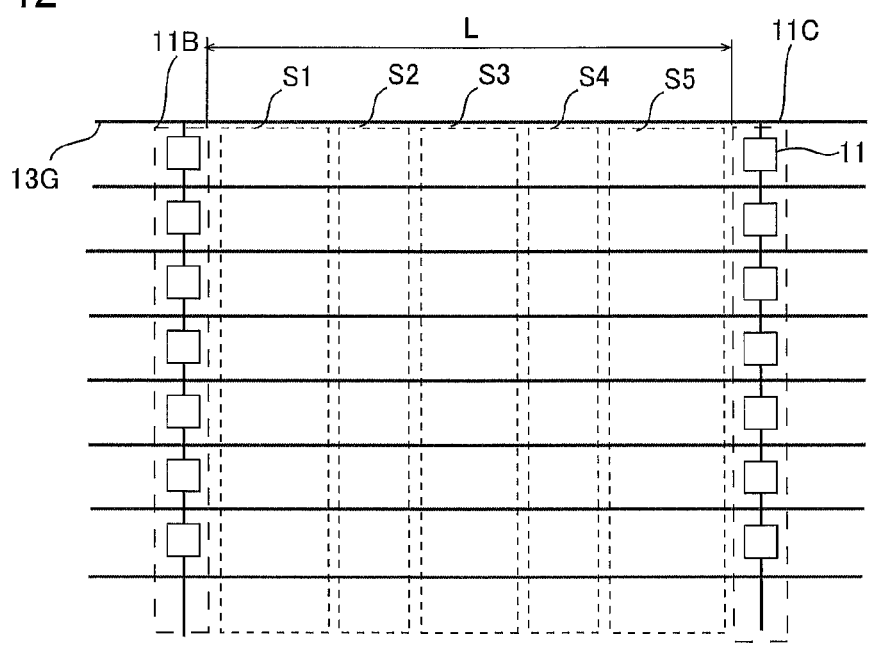
FIG. 12 is an enlarged schematic diagram illustrating a part of the active matrix substrate part illustrated in FIG. 11.

FIG. 12 is an enlarged view illustrating the portion where the gate driver group 11B and the gate driver group 11O are arranged, illustrated in FIG. 11. The region between the gate driver group 11B and the gate driver group 11O is a gate driver non-installation region. Since the elements composing the gate drivers 11 and the lines 15L1 are provided in the gate driver installation regions for the gate driver group 11B and the gate driver group 11O, the aperture ratios of the gate driver installation regions are lower than that of the gate driver non-installation region. In a case where the difference between the aperture ratio of the gate driver installation region and the aperture ratio of the gate driver non-installation region is great, a luminance difference that can be recognized by human eyes occurs, resulting in display irregularities.

In the present embodiment, in order to make the luminance difference between the gate driver installation region and the gate driver non-installation region hardly visible, the aperture ratio of the gate driver non-installation region is adjusted so that the aperture ratio of the gate driver non-installation region changes stepwise. More specifically, an adjustment line for adjusting the aperture ratio (an aperture ratio adjustment member) is provided in a part of pixel regions in the gate driver non-installation region (hereinafter referred to as an "adjustment region"), in accordance with the aperture ratio difference between the gate driver installation region and the gate driver non-installation region.

Figure 13:
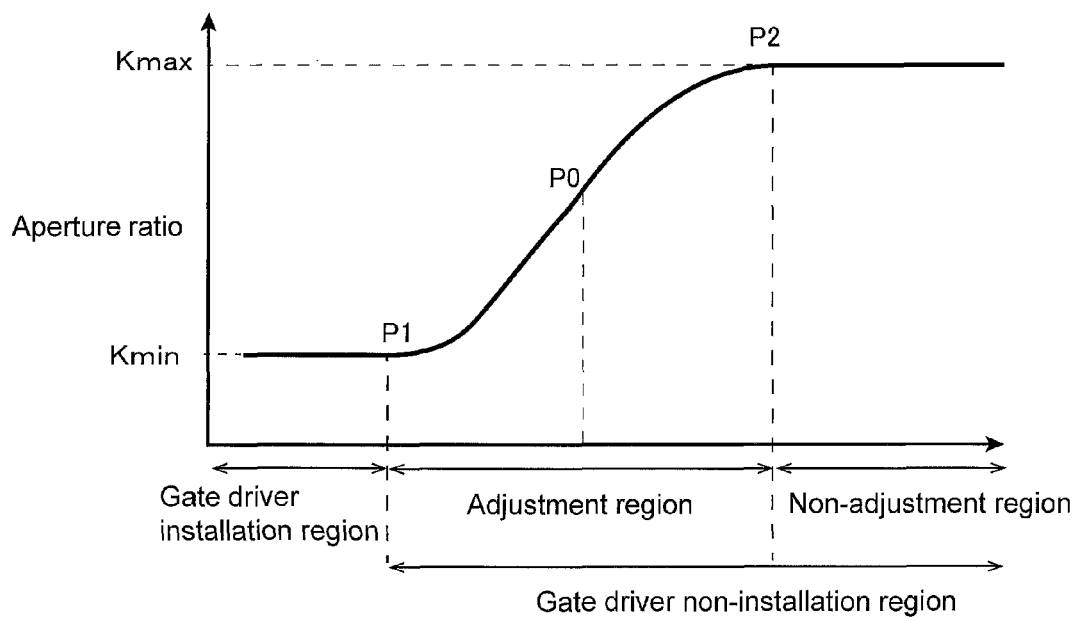
FIG. 13 illustrates changes of the aperture ratio in a gate driver installation region and a gate driver non-installation region.

FIG. 13 illustrates how the aperture ratio in the gate driver non-installation region changes in a case where the adjustment of the aperture ratio in the gate driver non-installation region is performed. As illustrated in FIG. 13, the inclination of the change of the aperture ratio in the adjustment region in the gate driver non-installation region (primary differential value of the aperture ratio) is maximized at an approximately intermediate position P0 in the adjustment region. Further, at a position P1 in the vicinities of the gate driver installation region, and a position P2 in the vicinities of a region in the gate driver non-installation region where the aperture ratio is not adjusted (hereinafter referred to as a "non-adjustment region"), the inclination of the change of the aperture ratio is minimized. The inclination of the change of the aperture ratio is determined depending on a difference between the aperture ratio of the gate driver installation region and the aperture ratio of the gate driver non-installation region, and the width of the adjustment region.

Figure 14:
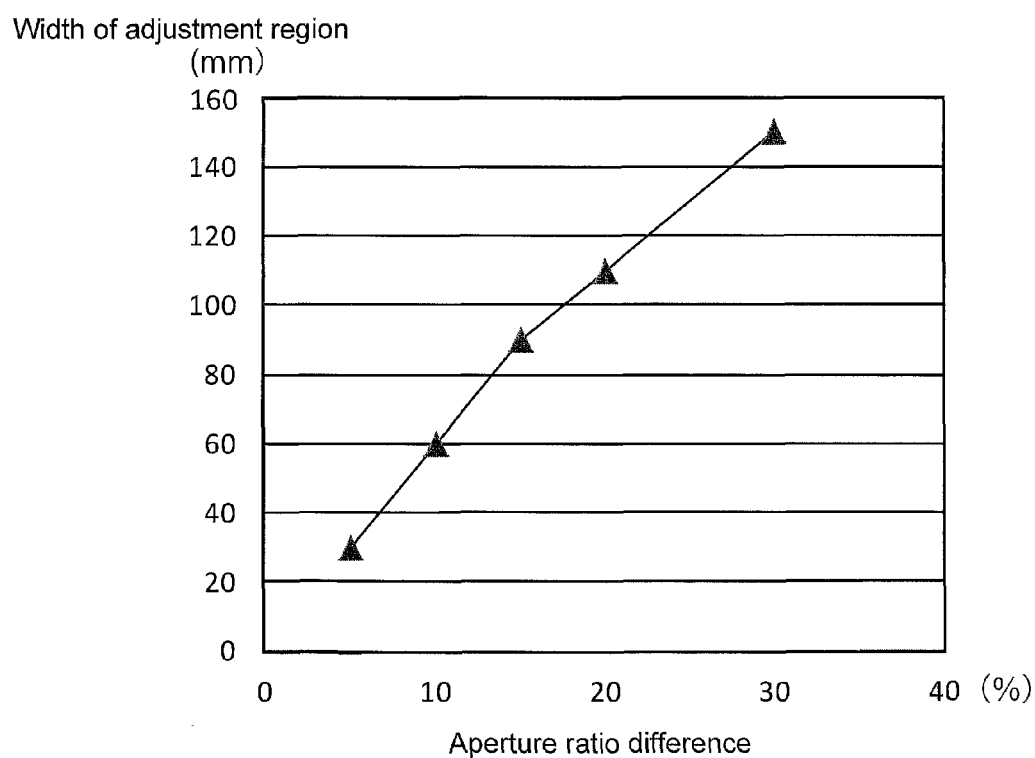
FIG. 14 illustrates the relationship between the aperture ratio difference between the gate driver installation region and the gate driver non-installation region, and the width of an adjustment region.

FIG. 14 illustrates the relationship between the aperture ratio difference and the width of the adjustment region. In FIG. 14, in a case where the difference between the aperture ratio of the gate driver installation region and the aperture ratio of the gate driver non-installation region is, for example, 10%, the width of the adjustment region is desirably about 60 mm, and in a case where the aperture ratio difference is 20%, the adjustment region width is desirably about 110 mm. In other words, the configuration is preferably such that as the aperture ratio difference between the gate driver installation region and the gate driver non-installation region increases, the adjustment region has a greater width.

Referring to the example illustrated in FIG. 12, the following description describes a case of the aperture ratio adjustment in which, in a gate driver non-installation region between the gate driver group 11B and the gate driver group 11O, regions S1 and S2, as well as regions S4 and S5 are used adjustment regions, and a region S3 is used as a non-adjustment region.

Figure 15A:
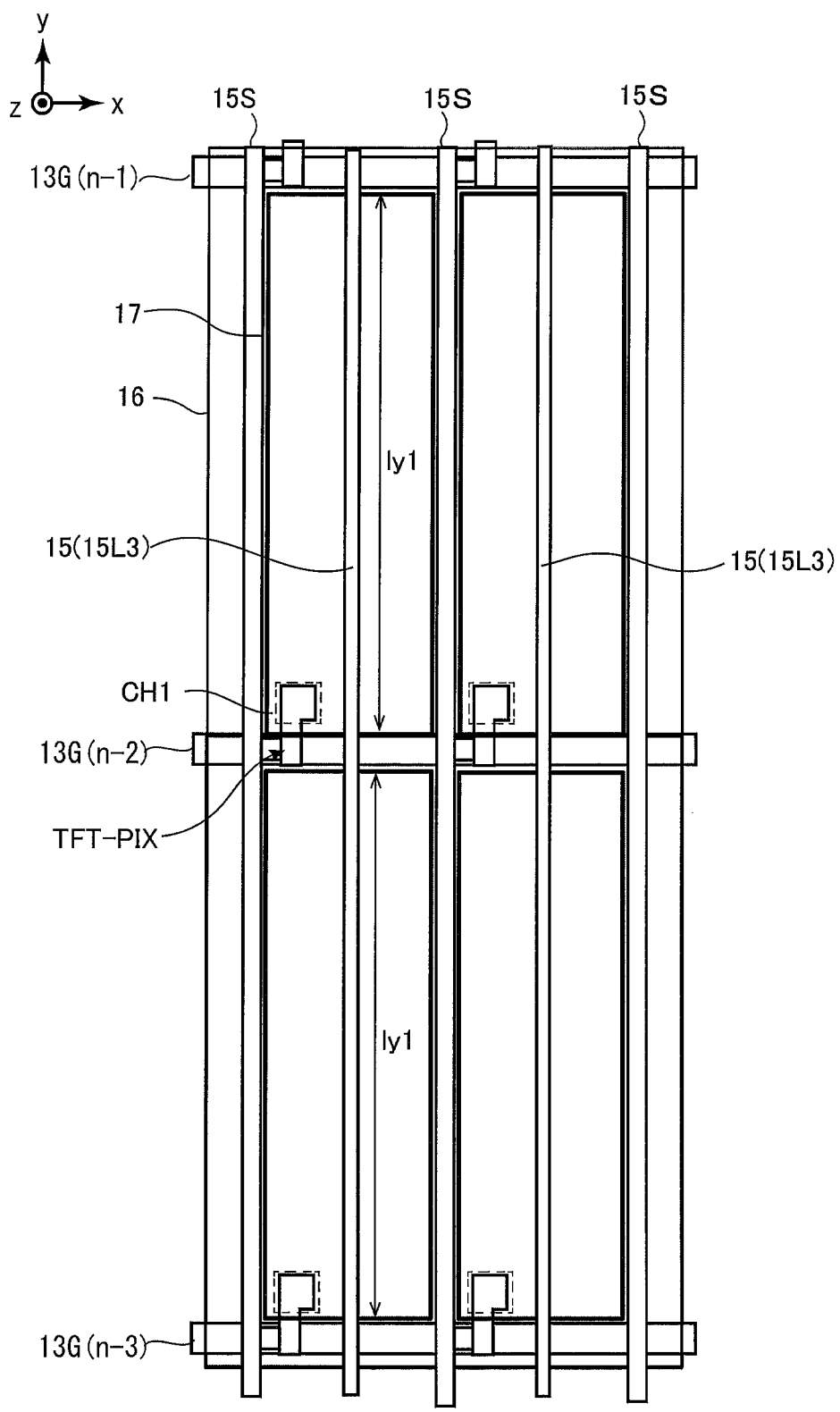
FIG. 15A illustrates an example of pixel regions in the regions S1 and S5 illustrated in FIG. 12.

FIG. 15A is a schematic diagram illustrating an example of a part of pixel regions in the regions S1 and S5 illustrated in FIG. 12. In FIG. 15A, illustration of the light-shielded region BM is omitted. As an example is illustrated in FIG. 15A, in the pixel regions in the regions S1 and S5, adjustment lines 15L3 approximately parallel to the source lines 15S are formed. The adjustment lines 15L3, like the lines 15L1, are formed simultaneously in the process in which the source line layer 15 is formed. Each line 15L3 is positioned approximately at the center in the width in the x axis direction of each pixel region, and is formed over pixel regions on the upper and lower sides (in the y axis direction). In the pixel region, the adjustment line 15L3 has a length equal to the width ly1 in the y axis direction in the pixel region. In the pixel regions in the region S1 and S5, therefore, the aperture ratios thereof decrease due to the adjustment lines 15L3, as compared with the case where no adjustment line 15L3 is provided.

Figure 15B:
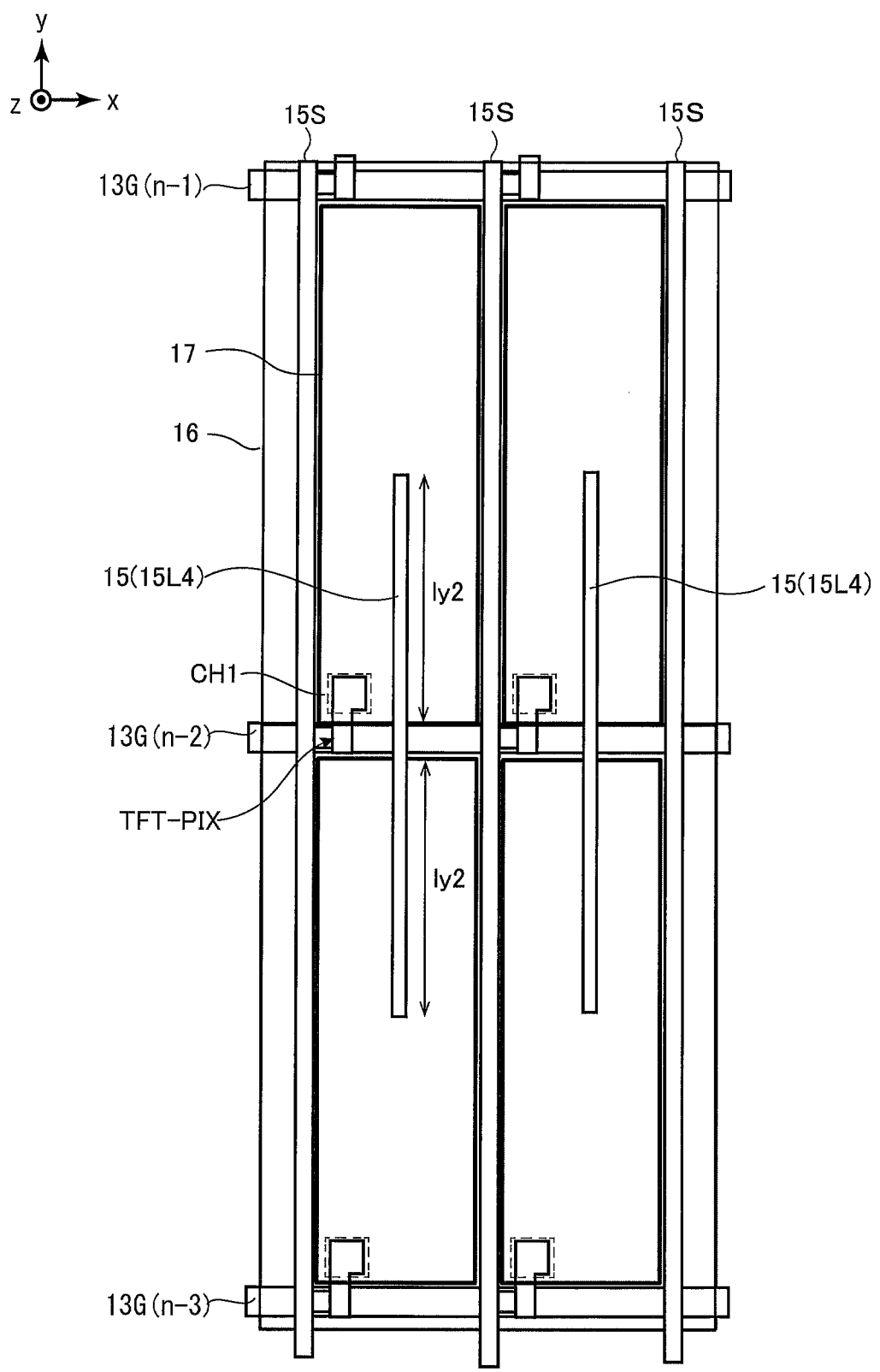
FIG. 15B illustrates an example of pixel regions in the regions S2 and S4 illustrated in FIG. 12.

FIG. 15B is a schematic diagram illustrating an example of a part of pixel regions in the regions S2 and S4 illustrated in FIG. 12. In FIG. 15B, illustration of the light-shielded region BM is omitted. As an example is illustrated in FIG. 15B, in the pixel regions in the regions S2 and S4, adjustment lines 15L4 approximately parallel to the source lines 15S are formed. The adjustment lines 15L4, like the lines 15L3, are formed simultaneously in the process in which the source line layer 15 is formed. Each adjustment line 15L4 is positioned approximately at the center in the width in the x axis direction of each pixel region, and is formed over pixel regions on the upper and lower sides (in the y axis direction), as is the case with the adjustment line 15L3. The adjustment line 15L4, however, has a length Ly2, which is shorter than the adjustment line 15L3. The adjustment line 15L4 and the adjustment line 15L3 have approximately equal widths in the x axis direction. In the pixel regions in the region S2 and S4, therefore, the aperture ratios thereof decrease due to the adjustment lines 15L4, as compared with the case where no adjustment line 15L4 is provided, but the aperture ratios thereof are higher than those in the regions S1 and S5.

As an example of the present embodiment, the case where the adjustment line 15L3 and the adjustment line 15L4 have approximately equal widths in the x axis direction, and different lengths in the y axis direction is described, but the configuration is not limited to this, as long as the widths and lengths of the adjustment lines 15L3, 15L4 are set so that the aperture ratios indicated in FIG. 13 can be achieved.

Figure 15C:
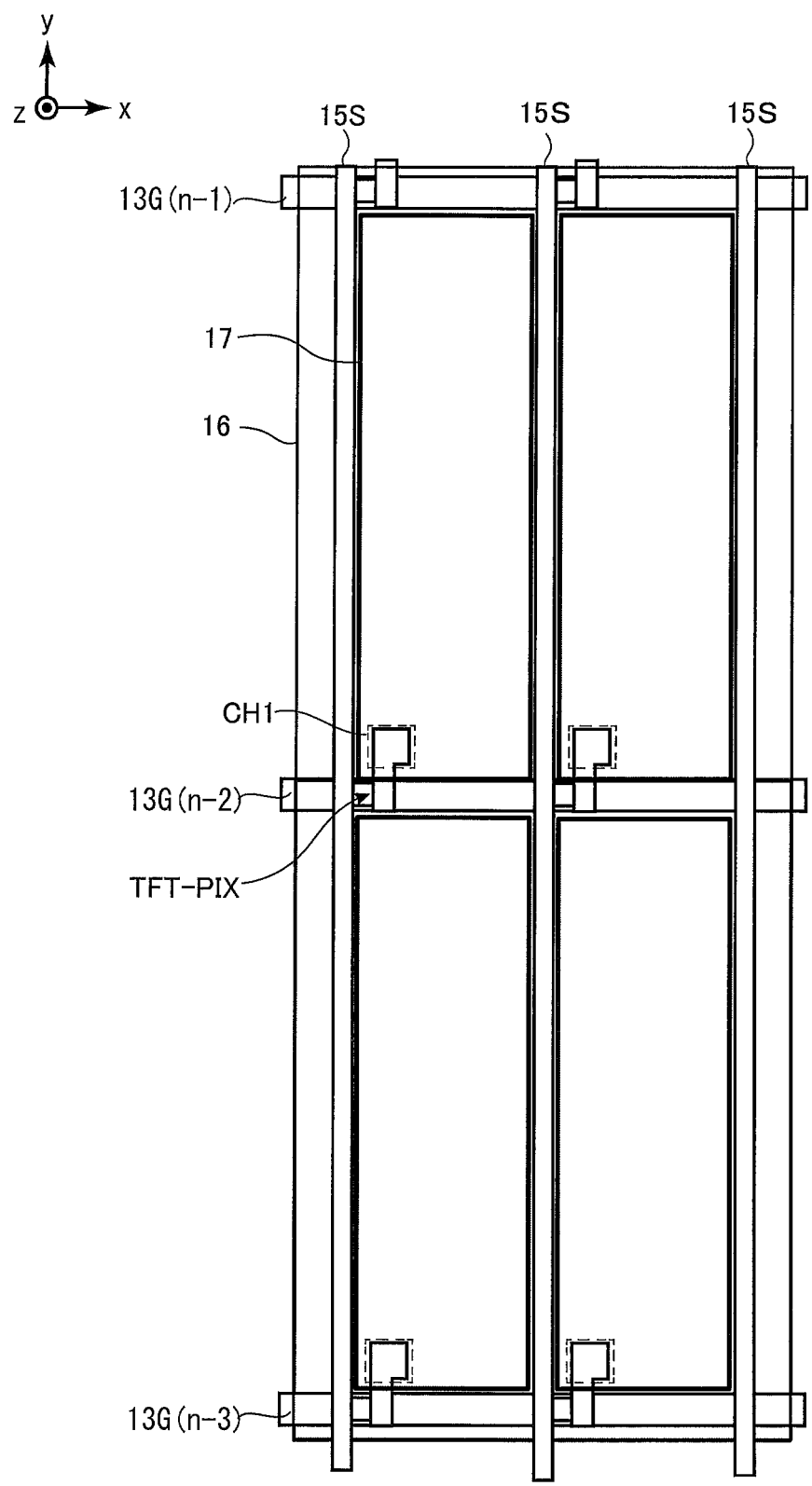
FIG. 15C illustrates an example of pixel regions in the region S3 illustrated in FIG. 12.

FIG. 15C is a schematic diagram illustrating an example of a part of pixel regions in the regions S3 illustrated in FIG. 12. In FIG. 15C, illustration of the light-shielded region BM is omitted. As an example is illustrated in FIG. 15C, no adjustment line is provided in the pixel regions in the region S3. In the display region, therefore, the aperture ratio in the pixel region in the region S3 has the maximum value (Kmax) in the display region.

With reference to the example illustrated in FIG. 12, the adjustment of the aperture ratios in the gate driver non-installation region between the gate driver group 11B and the gate driver group 11O is described, and as is the case with the above-described example, the adjustment lines 15L3, 15L4 are provided in the gate driver non-installation region between the gate driver group 11A and the gate driver group 11B, as well as in the gate driver non-installation region between the gate driver group 11O and the gate driver group 11D, in FIG. 11. Further, similarly, in the gate driver installation region between the gate driver group 11A and the boundary 200 as a boundary between the display region and the outside, as well as in the gate driver non-installation region between the gate driver installation region of the gate driver group 11D and the boundary 200 as a boundary between the display region and the outside in FIG. 11, adjustment lines are provided based on the curve indicating the change of the aperture ratio indicated in FIG. 13.

Referring to FIG. 12, an example in which, for convenience sake, adjustment lines are provided in the regions S1 and S2 as well as the regions S4 and S5, and the aperture ratio changes in three steps in the gate driver non-installation regions is described, but the configuration may be such that the adjustment region in the gate driver non-installation region is divided, and the proportion of the adjustment line in the pixel region is set for each divided region, in such a manner that the change of the aperture ratio in the adjustment region as illustrated in FIG. 13 is achieved. In short, adjustment lines may be provided in a part of the gate driver non-installation region so that, as the proximity to the gate driver installation region increases, the aperture ratio in the gate driver non-installation region should smoothly change toward the aperture ratio in the gate driver installation region.

In this way, in the active matrix substrate 20a, in a part of pixel regions in the gate driver non-installation region, adjustment lines are provided at a ratio according to the difference between the aperture ratio in the gate driver installation region and the aperture ratio in the gate driver non-installation region, whereby the luminance difference in the display region can be decreased, without an abrupt change of the aperture ratio between the gate driver installation region and the gate driver non-installation region. Consequently, as compared with a case where no adjustment line is provided, display irregularities occurring in the case where the gate drivers 11 are arranged in the display region can be reduced.

In the above-described example, the adjustment lines 15L3, 15L4, formed with the source line layer 15, are provided in a part of the pixel regions in the gate driver non-installation region, but the adjustment lines may be formed with the gate line layer 13. In short, the adjustment line may be formed using any line that does not transmit light, among the lines formed in the active matrix substrate 20a.

<Embodiment 2>

Described above as Embodiment 1 is an example in which the adjustment lines are provided in the gate driver non-installation region, at a ratio according to the difference between the aperture ratio in the gate driver installation region and the aperture ratio in the gate driver non-installation region. The following description describes, as the present embodiment, an example in which the aperture ratio in pixel region in the gate driver non-installation region is adjusted using the black matrix BM (aperture ratio adjustment member) on the counter substrate 20b. The following description describes the adjustment of the aperture ratio in the present embodiment, using the above-described example illustrated in FIG. 12.

Figure 16:
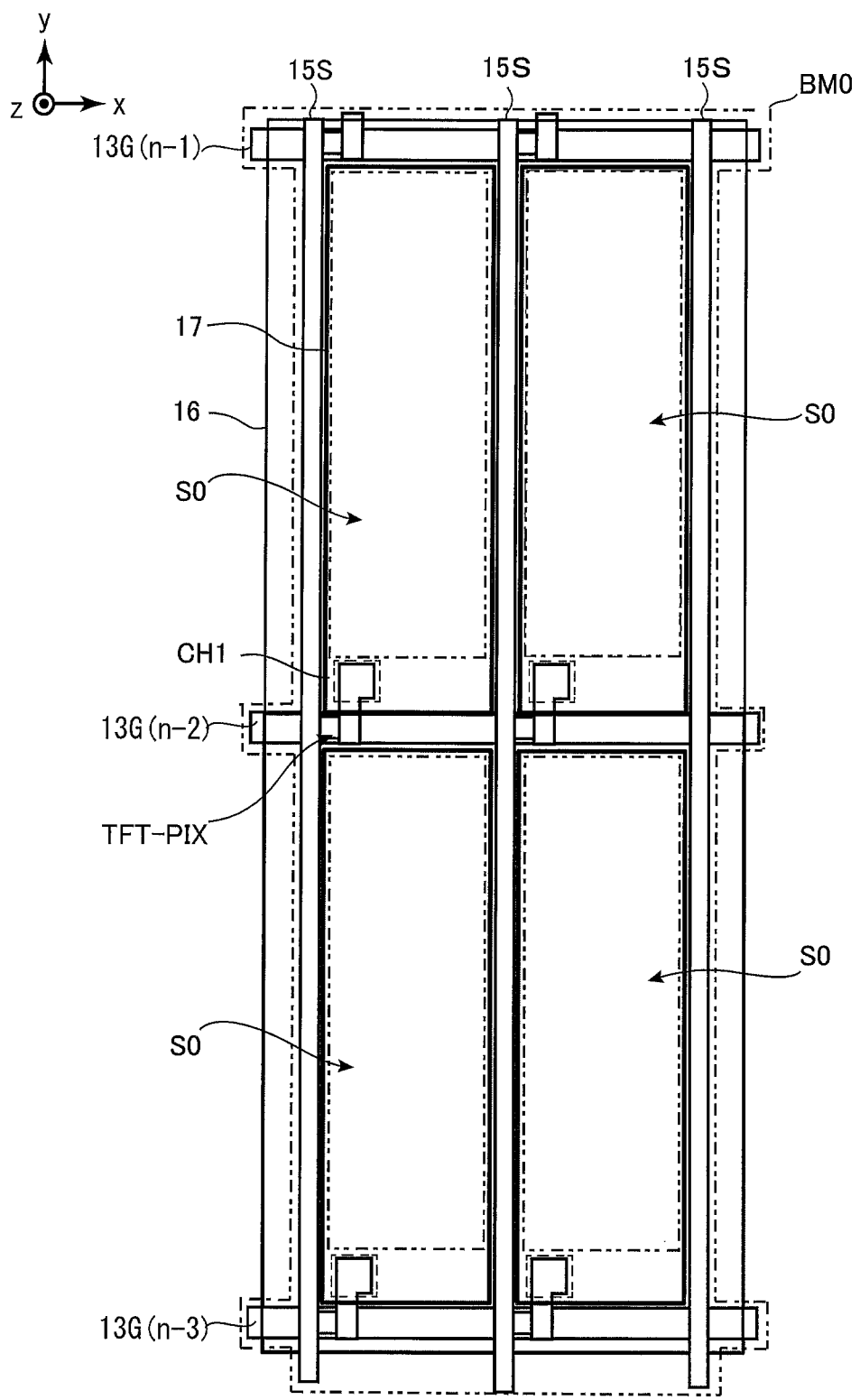
FIG. 16 illustrates a light-shielded region in a part of the pixel regions in a gate driver non-installation region in Embodiment 2.

As illustrated in FIGS. 7 and 9A to 9F mentioned above, each pixel region in the gate driver installation region is light-shielded by the light-shielded region BM. In FIGS. 7 and 9A to 9F, the light-shielded region BM includes the gate lines 13G, the source lines 15S, the elements composing the gate driver 11 except for a part of the lines 15L1, and the TFTs-PIX. On the other hand, in the pixel regions in the gate driver non-installation regions, neither elements composing the gate driver 11 nor lines 15L1 are provided. In the case where the aperture ratio is not to be adjusted in the gate driver non-installation region, therefore, the black matrix BM is formed on the counter substrate 20b in such a manner that the pixel regions in the gate driver non-installation region are light-shielded by a light-shielded region BM0 illustrated in FIG. 16. As illustrated in FIG. 16, the light-shielded region BM0 in the gate driver non-installation region includes the gate lines 13G, the source lines 15S, and the TFTs-PIX, and has an aperture S0 larger than that in the pixel region in the gate driver installation region. In other words, the gate driver non-installation region has an aperture ratio greater than that of the gate driver installation region, since no gate driver 11 is provided therein, and moreover, the proportion of the light-shielded region BM0 therein is smaller than that in the gate driver installation region. Consequently, in the display region, a luminance difference occurs between the gate driver installation region and the gate driver non-installation region, whereby display irregularities occur.

In the present embodiment, in order to make the luminance difference between the gate driver installation region and the gate driver non-installation region hardly visible, the proportion of the light-shielded region BM in the pixel region in the gate driver non-installation region in such a manner that the aperture ratio changes stepwise in the gate driver non-installation region. In other words, the proportion of the light-shielded region BM in the pixel region in the gate driver non-installation region is changed in such a manner that the change of the aperture ratio in the gate driver non-installation region should match with the change of the aperture ratio represented by the above-mentioned curve shown in FIG. 13.

Figure 17A:
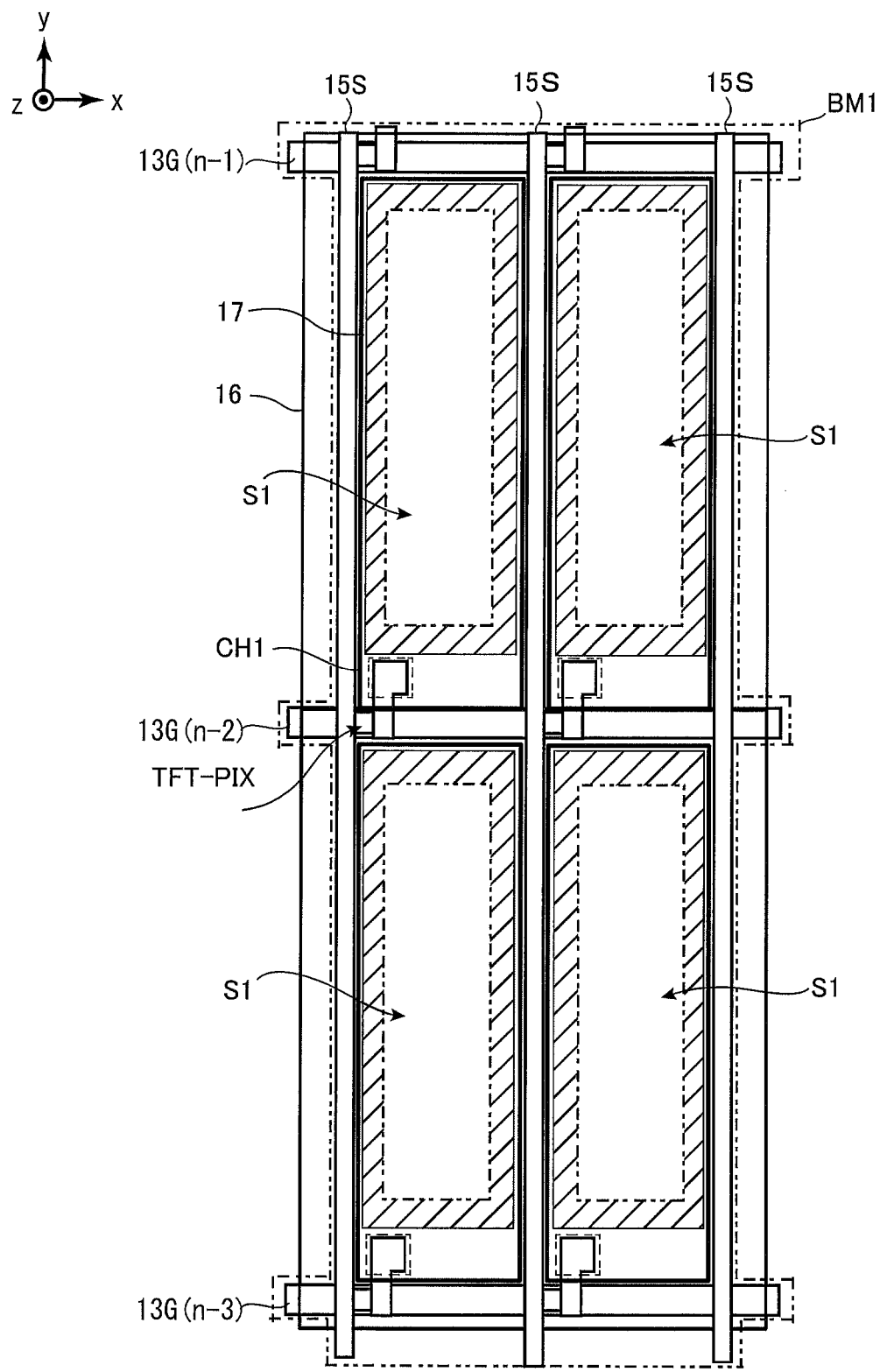
FIG. 17A illustrates an example of pixel regions in regions S1 and S5 illustrated in FIG. 12 in Embodiment 2.

FIG. 17A is a schematic diagram illustrating an example of a part of pixel regions in the regions S1 and S5 illustrated in FIG. 12. The pixel regions in the regions S1 and S5 are light-shielded in the light-shielded region BM1 by the black matrix formed on the counter substrate 20b. The light-shielded region BM1 extends into the inside of the pixel region, further than the light-shielded region BM0 illustrated in FIG. 16, by ±Δlx1 in the x axis direction, and by ±Δly1 in the y axis direction. In other words, the aperture S1 in each pixel region in the regions S1 and S5 is decreased for the hatched portion as compared with the aperture S0 in the pixel region illustrated in FIG. 16, whereby the aperture ratio thereof is reduced.

Figure 17B:
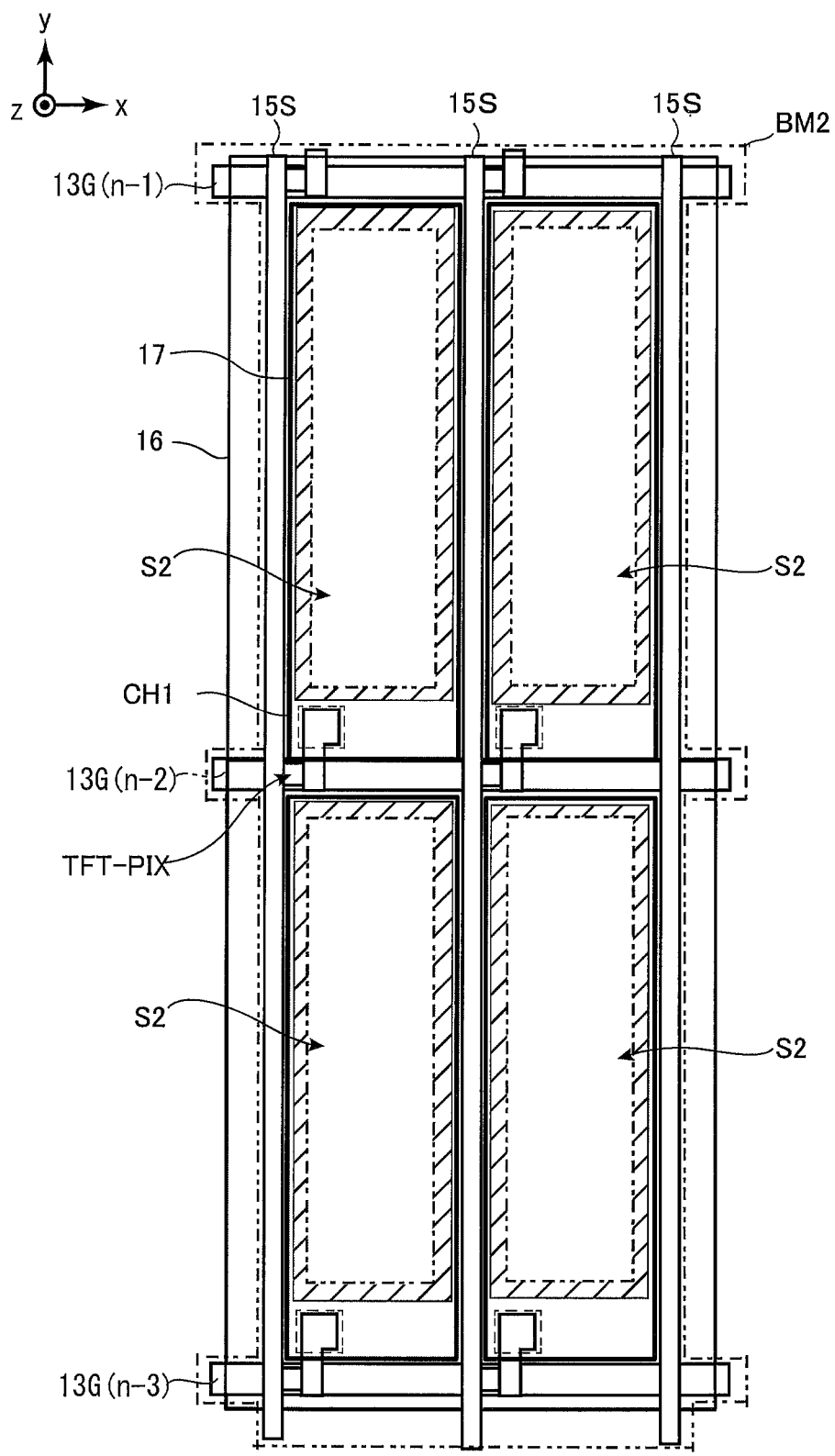
FIG. 17B illustrates an example of pixel regions in regions S2 and S4 illustrated in FIG. 12 in Embodiment 2.

FIG. 17B is a schematic diagram illustrating an example of a part of pixel regions in the regions S2 and S4 illustrated in FIG. 12. The pixel regions in the regions S2 and S4 are light-shielded in the light-shielded region BM2, by the black matrix formed on the counter substrate 20b. The light-shielded region BM2 extends into the inside of the pixel region, further than the light-shielded region BM0 illustrated in FIG. 16, by ±Δlx2 (Δlx1>Δlx2) in the x axis direction, and by ±Δly2 (Δly1>Δly2) in the y axis direction. In other words, the aperture S2 (S2<S1) in each pixel region in the regions S2 and S4 is decreased for the hatched portion as compared with the aperture S0 in the pixel region illustrated in FIG. 16, but it is greater than the aperture S1 in each of the pixel regions in the region S1 and S5. The pixel regions in the regions S2 and S4 have an aperture ratio that is lower than that in the pixel regions illustrated in FIG. 16, but is higher than the aperture ratio in the pixel regions in the regions S1 and S5.

The pixel regions in the region S3 illustrated in FIG. 12 are light-shielded in the light-shielded region BM0 illustrated in FIG. 16, by the black matrix formed on the counter substrate 20b. The aperture ratio in the pixel regions in the region S3, therefore, is maximized (Kmax) in the display region.

With reference to the above-described example, the adjustment of the aperture ratio in the gate driver non-installation region between the gate driver group 11B and the gate driver group 110 is described; the gate driver non-installation region between the gate driver group 11A and the gate driver group 11B illustrated in FIG. 11, as well as the gate driver non-installation region between the gate driver group 110 and the gate driver group 11D illustrated therein, as is the case with the above-described example, have light-shielded regions that are light-shielded by the black matrix formed on the counter substrate 20b. Further, in FIG. 11, in the gate driver non-installation region between the gate driver group 11A and the boundary 200 (boundary between the display region and the outside of the display region) and the gate driver non-installation region between the gate driver group 11D and the boundary 200 as well, light-shielded regions are provided by the black matrix formed on the counter substrate 20b, the light-shielded regions being based on the curve indicating the change of the aperture ratio illustrated in FIG. 13.

In the above-described example, for convenience sake, the aperture ratio in the gate driver non-installation region is changed in three steps, but the configuration may be such that the adjustment region in the gate driver non-installation region is divided, and the proportion of the light-shielded region BM in the pixel region is set for each divided region, in such a manner that the change of the aperture ratio in the adjustment region as shown in FIG. 13 is achieved. In short, light-shielded regions BM of the gate driver non-installation region may be provided so that, as the proximity to the gate driver installation region increases, the aperture ratio in the gate driver non-installation region should smoothly change toward the aperture ratio in the gate driver installation region.

In Embodiment 2 described above, the gate driver non-installation region is light-shielded by the black matrix at a ratio according to the difference between the aperture ratio in the gate driver installation region and the aperture ratio in the gate driver non-installation region, in such a manner that, as the proximity to the gate driver installation region increases, the light-shielded region becomes larger. This reduces the luminance difference between the gate driver installation region and the gate driver non-installation region in the display region, thereby reducing display irregularities, as compared with the case where the light-shielded region BM in the gate driver non-installation region is not adjusted.

<Embodiment 3>

Described above as Embodiments 1 and 2 is an example in which light is emitted so that luminance of the backlight is approximately uniform on the display region. On the other hand, in the present embodiment, the luminance of the backlight is changed on the display region, depending differences in aperture ratios in the display region. The following description describes this example.

Figure 18:
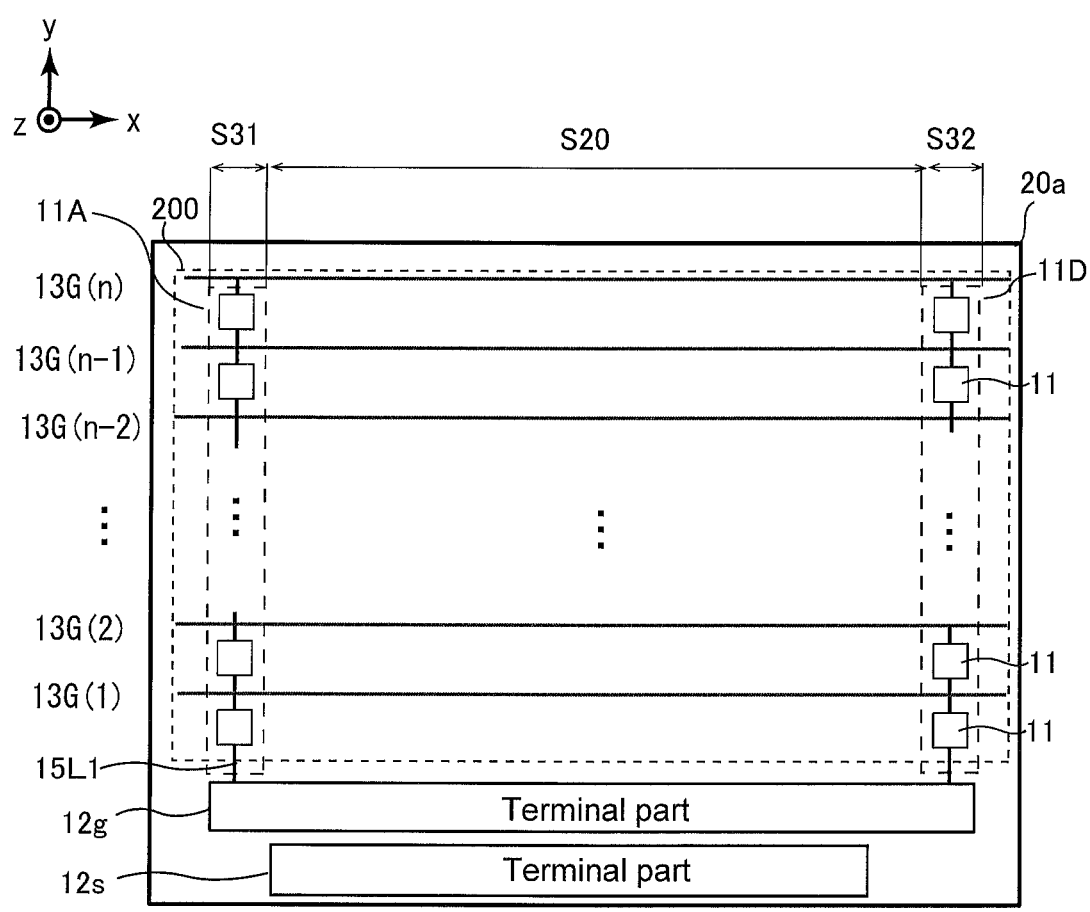
FIG. 18 is a schematic diagram illustrating a schematic configuration of an active matrix substrate in Embodiment 3.

In an example described above as Embodiments 1 and 2, the gate driver groups 11A, 11B, 11C, and 11D are provided in the display region, but as the present embodiment, for convenience of explanation, a configuration is described in which the gate driver groups 11A, 11D are provided in the display region, as illustrated in FIG. 18. In addition, in FIG. 18, the gate driver non-installation region S20 between the gate driver installation region in the gate driver group 11A and the gate driver installation region in the gate driver group 11D is, as is the case with Embodiment 1 or 2 described above, provided with an aperture ratio adjustment member that causes the aperture ratio in the gate driver non-installation region S20 to change stepwise, so as to reduce a luminance difference between the gate driver installation region and the gate driver non-installation region. In other words, an adjustment line or a light-shielded region BM (not shown) is provided in the gate driver non-installation region, so that, as the proximity to the gate driver installation region increases, the aperture ratio decreases.

Figure 19:
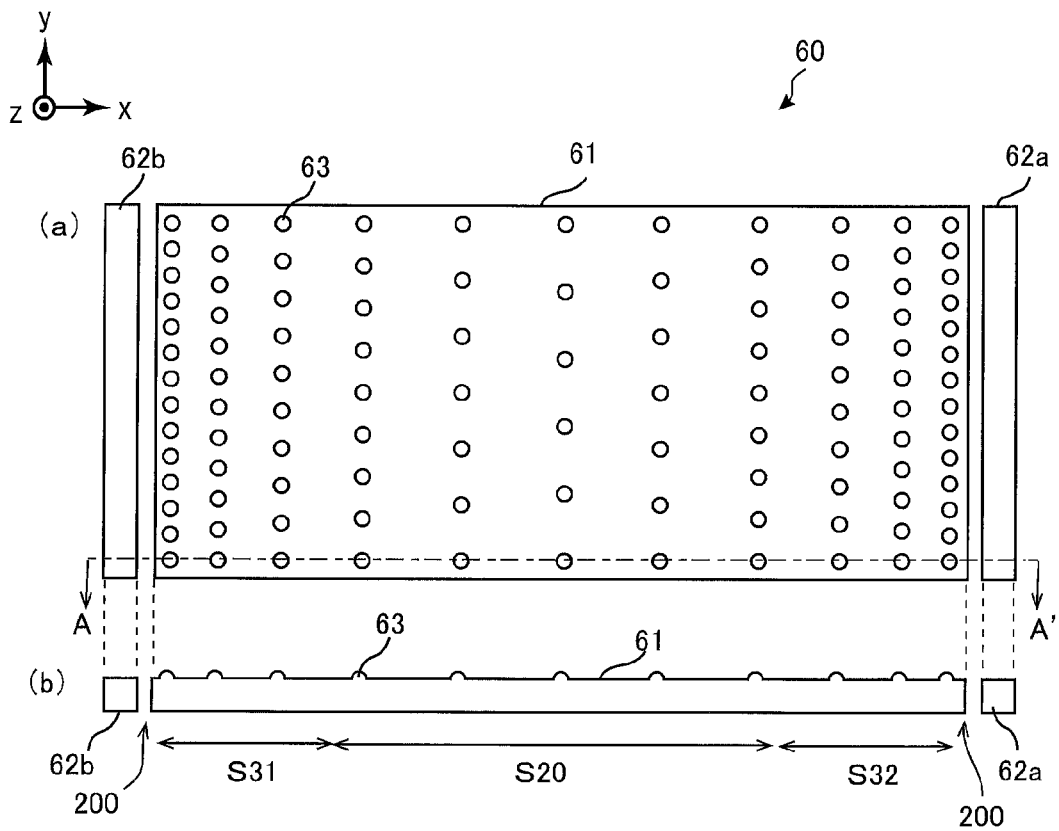
FIG. 19 is a schematic diagram illustrating a configuration of a backlight in Embodiment 3.

FIG. 19 is a schematic diagram illustrating a schematic configuration of a backlight of a backlight unit 6 in the present embodiment. FIG. 19(a) is a top view of the backlight, and FIG. 19(b) is a cross-sectional view of the backlight, taken along the line A-A' in FIG. 19(a).

As illustrated in FIG. 19(a), the backlight 60 includes a light guide plate 61, light emitting diodes (LEDs) 62a, 62b provided on side surfaces of the light guide plate 61, and optionally, a diffusion sheet (not shown) provided above the light guide plate 61. On the light guide plate 61, a plurality of scatterers 63 are provided that are for diffusing light of the LEDs 62*a*, 62*b*. As illustrated in FIG. 19(*b*), the scatterers 63 are in a hemispherical shape. On the light guide plate 61, the scatterers 63 are arranged in such a manner that the regions corresponding to the regions S21, S22 illustrated in FIG. 18 are provided with the scatterers 63 at a higher density as compared with a region corresponding to the region S23. In other words, the scatterers 63 are distributed in such a manner that, in the display region, as the proximity to the region with a lower aperture ratio increases, the luminance increases, and as the proximity to the region with a higher aperture ratio, the luminance decreases. The example shown here is an example in which the scatterers 63 are provided, but the configuration may be such that members for diffusing light, for example, protrusions and recesses in a wedge shape, are provided on the light guide plate 61. Alternatively, a dot film with gradation of black color or the like so as to cause the transmittance to change stepwise may be used for adjusting luminance. In short, the only requirement is as follows: in order that the luminance on the display surface is made uniform, on the active matrix substrate 20*a*, the amount of light irradiating the active matrix substrate 20*a* may be adjusted in such a manner that, with respect to the gate driver installation region, the amount of light from the backlight 60 thereto is greater than the amount of light to the gate driver non-installation region, and with respect to the gate driver non-installation region, the amount of light from the backlight 60 thereto is smaller than the amount of light with respect to the gate driver installation region.

Figure 20:
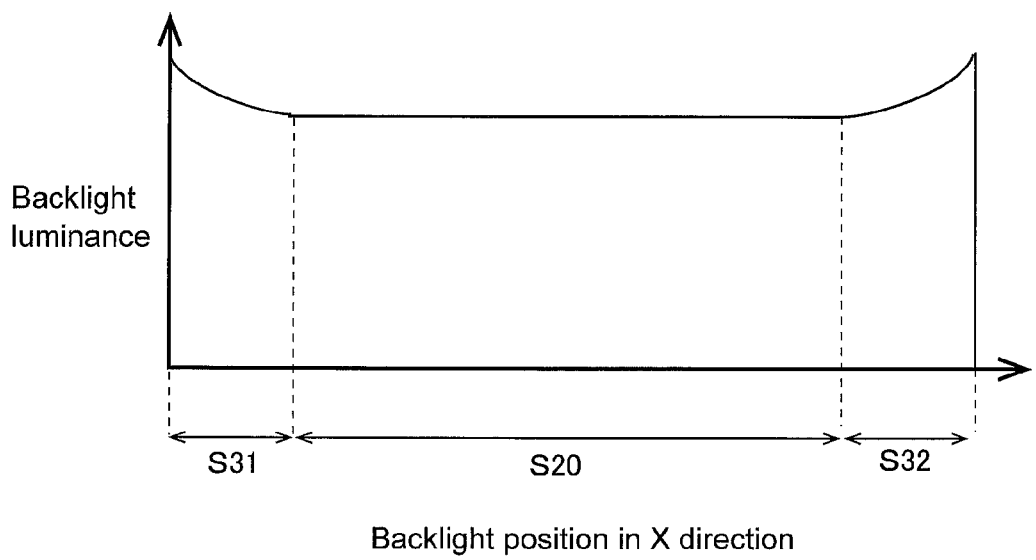
FIG. 20 shows luminance change of the backlight illustrated in FIG. 19 in a display region.

This causes the luminance of the backlight 60 on the display region changes as illustrated in FIG. 20. More specifically, the luminance of the backlight 60 in the region S20 is approximately uniform, the luminance of the backlight 60 in the regions S31 and S32 where the gate driver group 11A and the gate driver group 11D are arranged, respectively, is maximized in the vicinities of the boundary 200 (see FIGS. 18, 19), decreases as the proximity to the region S20 increases, and converges to the luminance of the backlight 60 in the region S20.

In Embodiments 1 and 2 described above, the luminance of the backlight 60 is approximately uniform in the display region. For this reason, in order to make the luminance difference on the display surface due to the difference between the aperture ratio of the gate driver installation region and the aperture ratio of the gate driver non-installation region invisible to human eyes, it is necessary to set the width of the adjustment region according to the aperture ratio difference shown in FIG. 13. In contrast, by changing the distribution of luminance of the backlight 60 in the display region according to the aperture ratio change (difference) in the display region, as in the present embodiment, the luminance difference on the display surface occurring due to the aperture ratio difference is reduced as compared with Embodiments 1 and 2, whereby the luminance of the display surface is made uniform, and display irregularities can be reduced. Besides, the difference between the luminance on the display surface in the gate driver installation region and that in the gate driver non-installation region decreases, whereby the width of the adjustment region can be made smaller than that in Embodiments 1 and 2.

Figure 21:
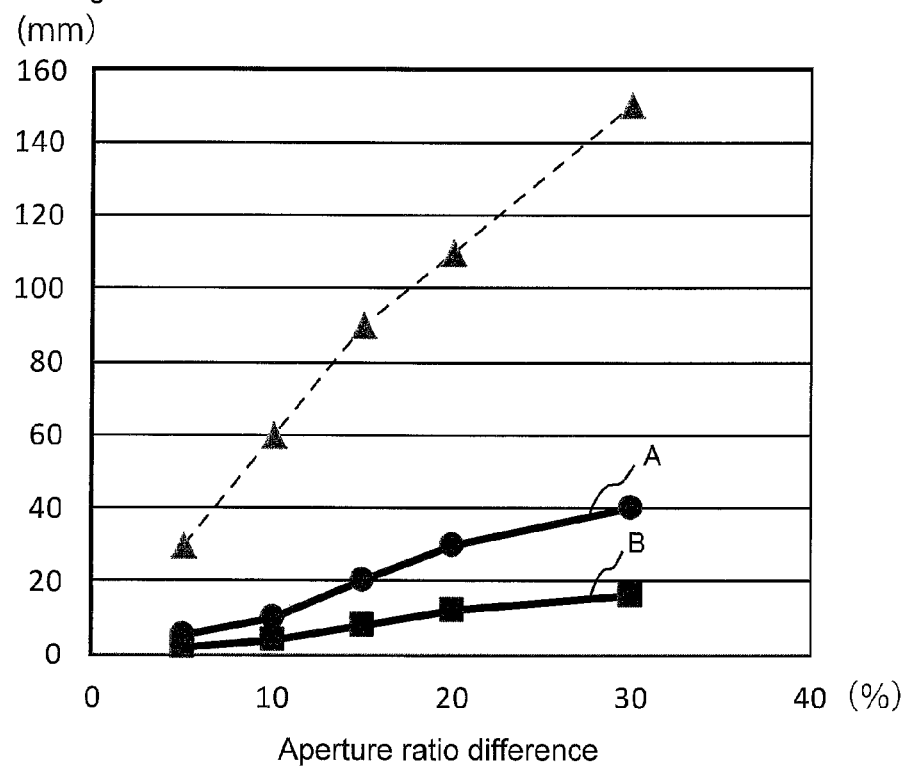
FIG. 21 illustrates the relationship between an aperture ratio difference between the gate driver installation region and the gate driver non-installation region, and the width of an adjustment region, in Embodiment 3.

FIG. 21 illustrates the relationship between the aperture ratio difference and the width of the adjustment region in a case where the luminance in the display region is changed. The solid line A in FIG. 20 indicates an ideal width of the adjustment region according to the aperture ratio difference, and the solid line B indicates the minimum value of the width of the adjustment region according to the aperture ratio difference. The broken line in FIG. 21 represents a case where the luminance in the display region is approximately uniform, that is, the relationship between the aperture ratio difference and the width of the adjustment region illustrated in FIG. 14.

As indicated by the solid lines A, B in FIG. 21, the width of the adjustment region when the aperture ratio difference is 10% is 5 mm or less, and the width of the adjustment region when the aperture ratio difference is 20% is 30 mm or less. As indicated by the solid lines A, B, in a case where the luminance is changed according to a change of the aperture ratio in the display region, the width of the adjustment region is smaller, as compared with the case where the luminance of the backlight 60 is approximately uniform. As compared with the case where the luminance of the backlight 60 in the display region is approximately uniform, therefore, the number of the gate drivers 11 for driving one gate line 13G can be increased, whereby the load on one gate driver 11 for driving the gate line 13G can be reduced.

<Modification Example>

The embodiments of the present invention are described above, but the embodiments described above are merely examples for implementing the present invention. The present invention, therefore, is not limited to the above-described embodiments, and can be implemented by appropriately varying and combining the above-described embodiments, without deviating from the scope of the present invention. The following description describes modification examples of the present invention.

(1) In Embodiments 1 to 3 described above, the pixel regions corresponding to one color among RGB may be provided with the elements composing the gate drivers 11. Further, in this case, the configuration may be such that the width in the x axis direction of the subpixel region in which the elements composing the gate driver 11 are provided is greater than the width of the other subpixel regions in the same pixel including the foregoing subpixel region, and the subpixel regions in the gate driver non-installation region have approximately equal widths in the x axis direction. With this configuration in which the subpixel region in which the gate driver 11 is provided is formed greater than the other subpixel regions in the gate driver installation region, the aperture ratio of the subpixel region in which the gate driver 11 is provided can be increased. Consequently, the difference between the aperture ratio of the gate driver installation region and the aperture ratio of the gate driver non-installation region decreases, which makes it possible to reduce the difference between the luminance in the gate driver installation region and the luminance in the gate driver non-installation region in the display region. Besides, even in a case where the subpixel regions are formed in small sizes, the size of the subpixel region of one color in the gate driver installation region may be formed greater than the sizes of the other subpixel regions, whereby the gate driver 11 can be arranged in the subpixel region.

(2) An example in which the semiconductor layer 14 of the switching element composing the gate driver 11 is formed with an oxide semiconductor is described above as Embodiment 1, but the semiconductor layer 14 may be formed with polysilicon, amorphous silicon, or the like.

(3) An example in which the gate lines 13G, the source lines 15S, the gate drivers 11, the terminal part 12*g* to which control signals for the gate drivers 11 and the like are input, and the terminal part 12*s* to which data signals for the source line 15S and the like are input, are formed on the substrate 20 of the active matrix substrate 20*a* is described above as Embodiment 1, but the source driver 3 and the display control circuit 4, in addition to these, may be formed thereon.

INDUSTRIAL APPLICABILITY

The present invention is applicable to a display device such as a liquid crystal display or the like.

The invention claimed is:

1. A display panel comprising:
   an active matrix substrate;
   a counter substrate; and
   a plurality of pixels in a display region, wherein
   the active matrix substrate is provided with lines including a plurality of gate lines and a plurality of source lines,
   the active matrix substrate includes, in the display region, a driving circuit to drive each of the plurality of gate lines, the driving circuit switching the plurality of gate lines between a selected state and a non-selected state,
   the plurality of pixels includes a non-installation pixel where the driving circuit is not provided and an installation pixel where the driving circuit is provided,
   the display panel further comprises, in the non-installation pixel, an aperture ratio adjustment member that changes an aperture ratio of the non-installation pixel stepwise, such that as a proximity to the installation pixel increases, an aperture ratio in the non-installation pixel decreases toward an aperture ratio in the installation pixel, the aperture ratio adjustment member being an adjustment line provided in the non-installation pixel or a black matrix corresponding to the non-installation pixel.

2. The display panel according to claim 1, wherein the adjustment line is defined with a same member as that of any of the lines, and is defined simultaneously in a same process in which said line is defined on the active matrix substrate.

3. The display panel according to claim 1, wherein the black matrix is defined on the counter substrate so that, in the non-installation pixel, the aperture ratio decreases as the proximity to the installation pixel increases.

4. The display panel according to claim 1, wherein
   the counter substrate further includes a color filter,
   each of the plurality of pixels includes subpixels of a plurality of colors,
   the driving circuit is arranged on one of the subpixels corresponding to one of the plurality of colors in the installation pixel, and
   the subpixel on which the driving circuit is provided is greater than the other subpixels provided in the installation pixel that includes said subpixel, and the subpixels provided in the non-installation pixel are approximately equal in sizes.

5. A display device comprising:
   the display panel according to claim 1, and
   a light emission portion that emits light from a side of the active matrix substrate of the display panel, in such a manner that a difference between a luminance in the installation region and a luminance in the non-installation region decreases.

* * * * *